(12) United States Patent
Dittmer

(10) Patent No.: US 8,072,739 B2
(45) Date of Patent: Dec. 6, 2011

(54) DEVICE MOUNT WITH SELECTIVELY POSITIONABLE TILT AXIS

(75) Inventor: Jay Dittmer, Prior Lake, MN (US)

(73) Assignee: Milestone AV Technologies LLC, Savage, MN (US)

( * ) Notice: Subject to any disclaimer, the term of this patent is extended or adjusted under 35 U.S.C. 154(b) by 0 days.

(21) Appl. No.: 12/522,142

(22) PCT Filed: Jan. 3, 2008

(86) PCT No.: PCT/US2008/000044
§ 371 (c)(1),
(2), (4) Date: Nov. 10, 2009

(87) PCT Pub. No.: WO2008/083396
PCT Pub. Date: Jul. 10, 2008

(65) Prior Publication Data
US 2010/0091438 A1    Apr. 15, 2010

Related U.S. Application Data

(60) Provisional application No. 60/883,303, filed on Jan. 3, 2007.

(51) Int. Cl.
*H05K 5/00*   (2006.01)
*E04G 3/00*   (2006.01)
*F16M 11/14*  (2006.01)

(52) U.S. Cl. ......... 361/679.01; 361/679.04; 361/679.06; 361/679.07; 361/679.27; 361/679.28; 248/274.1; 248/184.1; 248/284.1; 248/278.1; 349/58

(58) Field of Classification Search ............ 361/679.01, 361/679.02, 679.21–679.3; 349/58; 312/223.1, 312/223.2; 248/923
See application file for complete search history.

(56) References Cited

U.S. PATENT DOCUMENTS

| 153,943 A | 8/1874 | Gray |
| 212,618 A | 2/1879 | Miller |
| 257,050 A | 4/1882 | Munson |
| 1,282,489 A | 10/1918 | Strodel |

(Continued)

FOREIGN PATENT DOCUMENTS

DE    3215379 A1    10/1983

(Continued)

OTHER PUBLICATIONS

PCT Search Report and Written Opinion for International Application No. PCT/US2008/000117, Mailed Jun. 11, 2008. 12 Pgs.

(Continued)

*Primary Examiner* — Jayprakash N Gandhi
*Assistant Examiner* — Jerry Wu
(74) *Attorney, Agent, or Firm* — Patterson Thuente Christensen Pedersen, P.A.

(57) ABSTRACT

A mounting system for an electronic display device includes a display interface having an interface member presenting a display mounting surface and a tilt head assembly defining a substantially horizontal tilt axis oriented generally parallel with, and spaced apart from, the display mounting surface. The tilt head assembly includes a control mechanism for selectively shifting the tilt axis between a first location spaced apart a first distance from the display mounting surface and a second location spaced apart a second distance from the display mounting surface, wherein the second distance is greater than the first distance.

21 Claims, 16 Drawing Sheets

U.S. PATENT DOCUMENTS

| | | |
|---|---|---|
| 1,320,775 A | 11/1919 | Mather |
| 1,358,159 A | 11/1920 | Kern |
| 1,574,277 A | 2/1926 | Andersen |
| 1,628,218 A | 5/1927 | Beauchamp |
| 1,646,379 A | 10/1927 | Whitehead |
| 1,977,153 A | 10/1934 | Spence, Jr. |
| 2,030,889 A | 2/1936 | Negrotto |
| 2,233,882 A | 3/1941 | Bobek |
| 2,466,219 A | 4/1949 | Farrell et al. |
| 2,525,534 A | 10/1950 | Ernisse |
| 2,734,708 A | 2/1956 | Cohn |
| 2,967,035 A | 10/1961 | Simons |
| 3,182,946 A | 5/1965 | Dudko |
| 3,574,340 A | 4/1971 | Busche |
| 4,068,961 A | 1/1978 | Ebner et al. |
| 4,238,802 A | 12/1980 | Speicher |
| 4,483,503 A | 11/1984 | Gahan |
| 4,483,803 A | 11/1984 | Rizkalla |
| 4,549,710 A | 10/1985 | Prince et al. |
| 4,554,590 A | 11/1985 | Chelin et al. |
| 4,562,988 A | 1/1986 | Bumgardner |
| 4,621,782 A | 11/1986 | Carlson et al. |
| 4,645,153 A | 2/1987 | Granzow et al. |
| 4,652,890 A | 3/1987 | Crean |
| 4,687,305 A | 8/1987 | Harris, Jr. et al. |
| 4,708,312 A | 11/1987 | Rohr |
| 4,718,317 A | 1/1988 | Hensler |
| 4,762,378 A | 8/1988 | Kagami |
| 4,768,744 A | 9/1988 | Leeds et al. |
| 4,814,759 A | 3/1989 | Gombrich et al. |
| 4,836,478 A | 6/1989 | Sweere |
| 4,836,486 A | 6/1989 | Vossoughi et al. |
| 4,844,387 A | 7/1989 | Sorgi et al. |
| 4,880,191 A | 11/1989 | Lake, Jr. |
| 4,934,645 A | 6/1990 | Breslow |
| 4,989,813 A | 2/1991 | Kim et al. |
| 5,037,050 A | 8/1991 | Lin et al. |
| 5,040,759 A | 8/1991 | Wainwright |
| 5,102,081 A | 4/1992 | Barchus |
| 5,102,082 A | 4/1992 | Bang |
| 5,139,223 A | 8/1992 | Sedighzadeh |
| 5,165,644 A | 11/1992 | Allen |
| 5,195,900 A | 3/1993 | Kumagai et al. |
| 5,209,446 A | 5/1993 | Kawai |
| 5,277,392 A | 1/1994 | Rossman et al. |
| 5,305,114 A | 4/1994 | Egashira et al. |
| 5,322,255 A | 6/1994 | Garrett |
| 5,398,901 A | 3/1995 | Brodmann et al. |
| 5,404,182 A | 4/1995 | Nomura |
| D361,062 S | 8/1995 | Lino et al. |
| D361,068 S | 8/1995 | Brehmer et al. |
| 5,465,557 A | 11/1995 | Harte |
| 5,520,361 A | 5/1996 | Lee |
| 5,553,820 A | 9/1996 | Karten et al. |
| 5,582,375 A | 12/1996 | Martin |
| 5,584,735 A | 12/1996 | McMath |
| 5,603,478 A | 2/1997 | Wang |
| 5,632,463 A | 5/1997 | Sung et al. |
| 5,634,622 A | 6/1997 | Pye |
| 5,664,752 A | 9/1997 | Matthiessen et al. |
| 5,687,939 A | 11/1997 | Moscovitch |
| 5,687,944 A | 11/1997 | Shon |
| 5,713,549 A | 2/1998 | Shieh |
| 5,732,922 A | 3/1998 | Jeon |
| 5,743,503 A | 4/1998 | Voeller et al. |
| 5,751,548 A | 5/1998 | Hall et al. |
| 5,768,648 A | 6/1998 | Skipp et al. |
| D395,892 S | 7/1998 | Solomon |
| 5,793,503 A | 8/1998 | Haines et al. |
| 5,797,568 A | 8/1998 | Canton Gongora et al. |
| 5,842,672 A | 12/1998 | Sweere et al. |
| 5,854,735 A | 12/1998 | Cheng |
| 5,876,008 A | 3/1999 | Sweere et al. |
| 5,918,841 A | 7/1999 | Sweere et al. |
| 5,918,845 A | 7/1999 | Whitaker |
| 5,923,528 A | 7/1999 | Lee |
| 5,923,852 A | 7/1999 | Lee |
| 5,924,665 A | 7/1999 | Sweere et al. |
| 5,941,493 A | 8/1999 | Cheng |
| 5,947,429 A | 9/1999 | Sweere et al. |
| D415,768 S | 10/1999 | Howell |
| 5,992,809 A | 11/1999 | Sweere et al. |
| 6,000,560 A | 12/1999 | Barkan |
| 6,012,693 A | 1/2000 | Voeller et al. |
| 6,015,120 A | 1/2000 | Sweere et al. |
| 6,019,332 A | 2/2000 | Sweere et al. |
| 6,036,337 A | 3/2000 | Belfer |
| 6,042,068 A | 3/2000 | Tcherny |
| 6,045,103 A | 4/2000 | Costa et al. |
| 6,047,939 A | 4/2000 | Kim |
| 6,048,013 A | 4/2000 | Moilanen et al. |
| 6,068,227 A | 5/2000 | Morgan et al. |
| 6,086,034 A | 7/2000 | McAllister et al. |
| 6,102,348 A | 8/2000 | O'Neill |
| 6,113,047 A | 9/2000 | Wung et al. |
| 6,119,997 A | 9/2000 | Van Lieshout |
| 6,125,030 A | 9/2000 | Mola et al. |
| 6,126,128 A | 10/2000 | Costa et al. |
| 6,138,970 A | 10/2000 | Sohrt et al. |
| RE36,978 E | 12/2000 | Moscovitch |
| 6,189,842 B1 | 2/2001 | Bergeron Gull et al. |
| 6,189,850 B1 | 2/2001 | Liao et al. |
| D440,863 S | 4/2001 | Worrall |
| 6,213,438 B1 | 4/2001 | Ostby et al. |
| 6,213,821 B1 | 4/2001 | Bernloehr et al. |
| 6,244,552 B1 | 6/2001 | Adams et al. |
| 6,264,152 B1 | 7/2001 | Bloch et al. |
| 6,273,382 B1 | 8/2001 | Pemberton |
| 6,273,383 B1 | 8/2001 | Oddsen, Jr. |
| 6,292,981 B1 | 9/2001 | Ford et al. |
| 6,336,037 B1 | 1/2002 | Sekine et al. |
| 6,340,146 B1 | 1/2002 | Tzeng |
| 6,347,776 B1 | 2/2002 | Chuang |
| 6,354,549 B2 | 3/2002 | Sweere et al. |
| 6,361,012 B1 | 3/2002 | Chang |
| 6,367,756 B1 | 4/2002 | Wang |
| 6,378,171 B1 | 4/2002 | Suzuki et al. |
| 6,378,830 B1 | 4/2002 | Lu |
| 6,394,403 B1 | 5/2002 | Hung |
| 6,402,109 B1 | 6/2002 | Dittmer |
| 6,409,127 B1 | 6/2002 | VanderHeide et al. |
| 6,409,134 B1 | 6/2002 | Oddsen, Jr. |
| D460,078 S | 7/2002 | Li |
| 6,416,027 B1 | 7/2002 | Hart |
| 6,418,010 B1 | 7/2002 | Sawyer |
| 6,419,196 B1 | 7/2002 | Sweere et al. |
| 6,450,467 B2 | 9/2002 | Timm |
| 6,453,509 B1 | 9/2002 | Shin |
| 6,454,234 B1 | 9/2002 | Westbrook |
| 6,478,275 B1 | 11/2002 | Huang |
| 6,484,987 B2 | 11/2002 | Weaver |
| 6,487,274 B2 | 11/2002 | Bertsche |
| 6,494,429 B2 | 12/2002 | Tajima |
| 6,505,988 B1 | 1/2003 | Oddsen, Jr. |
| 6,510,049 B2 | 1/2003 | Rosen |
| 6,517,040 B1 | 2/2003 | Wen |
| 6,530,546 B1 | 3/2003 | Cyrell |
| 6,543,734 B2 | 4/2003 | Yeh |
| 6,554,238 B1 | 4/2003 | Hibberd |
| 6,554,242 B2 | 4/2003 | Kim |
| 6,559,829 B1 | 5/2003 | Matsuo et al. |
| 6,560,094 B2 | 5/2003 | Schmidt |
| 6,565,056 B2 | 5/2003 | Lin |
| 6,575,419 B1 | 6/2003 | Masuda et al. |
| D477,606 S | 7/2003 | Theis et al. |
| 6,585,203 B1 | 7/2003 | Euker |
| 6,592,090 B1 | 7/2003 | Li |
| 6,594,143 B2 | 7/2003 | Yano et al. |
| 6,604,722 B1 | 8/2003 | Tan |
| 6,654,235 B2 | 11/2003 | Imsand |
| 6,663,064 B1 | 12/2003 | Langner et al. |
| 6,671,928 B2 | 1/2004 | Huang |
| 6,672,553 B1 | 1/2004 | Lin |
| 6,695,270 B1 | 2/2004 | Smed |
| 6,752,363 B2 | 6/2004 | Boele |
| D493,800 S | 8/2004 | Pfister et al. |
| D494,596 S | 8/2004 | Pfister |

| | | | |
|---|---|---|---|
| D494,978 S | 8/2004 | Pfister | |
| D495,713 S | 9/2004 | Pfister et al. | |
| 6,874,743 B2 | 4/2005 | Watanabe et al. | |
| 6,905,101 B1 | 6/2005 | Dittmer | |
| 6,923,413 B2 | 8/2005 | Dozier | |
| 6,966,532 B2 | 11/2005 | Ishizaki et al. | |
| 7,018,961 B2 | 3/2006 | Tazaki | |
| 7,152,836 B2 | 12/2006 | Pfister et al. | |
| 7,178,775 B2 | 2/2007 | Pfister et al. | |
| 7,380,760 B2 | 6/2008 | Dittmer | |
| 7,387,286 B2 | 6/2008 | Dittmer et al. | |
| 7,395,996 B2 | 7/2008 | Dittmer | |
| 7,438,296 B2 | 10/2008 | Stevens | |
| 7,571,883 B2 * | 8/2009 | Van Groesen et al. | 248/282.1 |
| 2001/0050327 A1 | 12/2001 | Sweere et al. | |
| 2002/0011544 A1 | 1/2002 | Bosson | |
| 2002/0033436 A1 | 3/2002 | Peng et al. | |
| 2002/0084396 A1 | 7/2002 | Weaver | |
| 2002/0179791 A1 | 12/2002 | Kwon | |
| 2002/0179801 A1 | 12/2002 | Kim | |
| 2002/0190180 A1 | 12/2002 | Cotterill | |
| 2003/0042385 A1 | 3/2003 | Hung et al. | |
| 2003/0075653 A1 | 4/2003 | Li | |
| 2003/0136888 A1 | 7/2003 | Boele | |
| 2003/0154673 A1 | 8/2003 | MacGregor et al. | |
| 2003/0201372 A1 | 10/2003 | Dozier | |
| 2003/0227739 A1 | 12/2003 | Kim et al. | |
| 2004/0011932 A1 | 1/2004 | Duff | |
| 2004/0011938 A1 | 1/2004 | Oddsen, Jr. | |
| 2004/0056161 A1 | 3/2004 | Ishizaki et al. | |
| 2004/0079849 A1 | 4/2004 | Rudolf | |
| 2004/0211870 A1 | 10/2004 | Bremmon et al. | |
| 2004/0232298 A1 | 11/2004 | Bremmon | |
| 2004/0232301 A1 | 11/2004 | Bremmon | |
| 2004/0245420 A1 | 12/2004 | Pfister et al. | |
| 2005/0051688 A1 | 3/2005 | Dittmer | |
| 2005/0133678 A1 | 6/2005 | Dittmer | |
| 2005/0263659 A1 | 12/2005 | Pfister et al. | |
| 2006/0065800 A1 * | 3/2006 | Bremmon | 248/274.1 |
| 2006/0186294 A1 * | 8/2006 | Van Groesen et al. | 248/284.1 |
| 2006/0231711 A1 | 10/2006 | Shin | |
| 2006/0244870 A1 | 11/2006 | Yamato et al. | |
| 2007/0090250 A1 | 4/2007 | O'Keene | |
| 2007/0176067 A1 | 8/2007 | Monaco | |
| 2007/0181762 A1 * | 8/2007 | Dittmer | 248/274.1 |
| 2007/0235614 A1 | 10/2007 | O'Keene et al. | |
| 2008/0315049 A1 * | 12/2008 | Bailo et al. | 248/176.1 |
| 2009/0084918 A1 | 4/2009 | Pfister et al. | |

FOREIGN PATENT DOCUMENTS

| | | |
|---|---|---|
| DE | 29809300 U1 | 8/1998 |
| GB | 1280913 A | 7/1972 |
| GB | 994246 | 8/1980 |
| JP | 2000-214787 | 8/2000 |
| JP | 3078557 U | 4/2001 |
| JP | 2001-142408 | 5/2001 |
| JP | 2001-175188 A | 6/2001 |
| JP | 2005-208080 | 8/2005 |
| JP | 20060071769 A | 3/2006 |
| KR | 2019980025444 | 12/1998 |
| KR | 1020030094458 | 12/2003 |
| KR | 1020040021741 | 3/2004 |
| KR | 1020040037618 | 5/2004 |
| KR | 1020050058738 | 6/2005 |
| KR | 20060034351 | 4/2006 |
| WO | WO00/73697 A1 | 12/2000 |
| WO | WO02/42681 A1 | 5/2002 |
| WO | WO2004/070257 A1 | 8/2004 |
| WO | WO2006/044969 A1 | 4/2006 |
| WO | WO2006/095379 A1 | 9/2006 |
| WO | WO2006/133188 A2 | 12/2006 |
| WO | WO2008/085889 A1 | 7/2008 |

OTHER PUBLICATIONS

European Search Report re European App. Ser. No. EPO8712990, dated Nov. 10, 2009.
File History for U.S. Appl. No. 12/518,593.
EPO Search Report Cited Cited in Related European Application No. EP 08705455, dated Mar. 24, 2011.
Chinese Office Action Dated Apr. 20, 2011, Cited in Chinese Patent Application No. 200880006670.7.

* cited by examiner

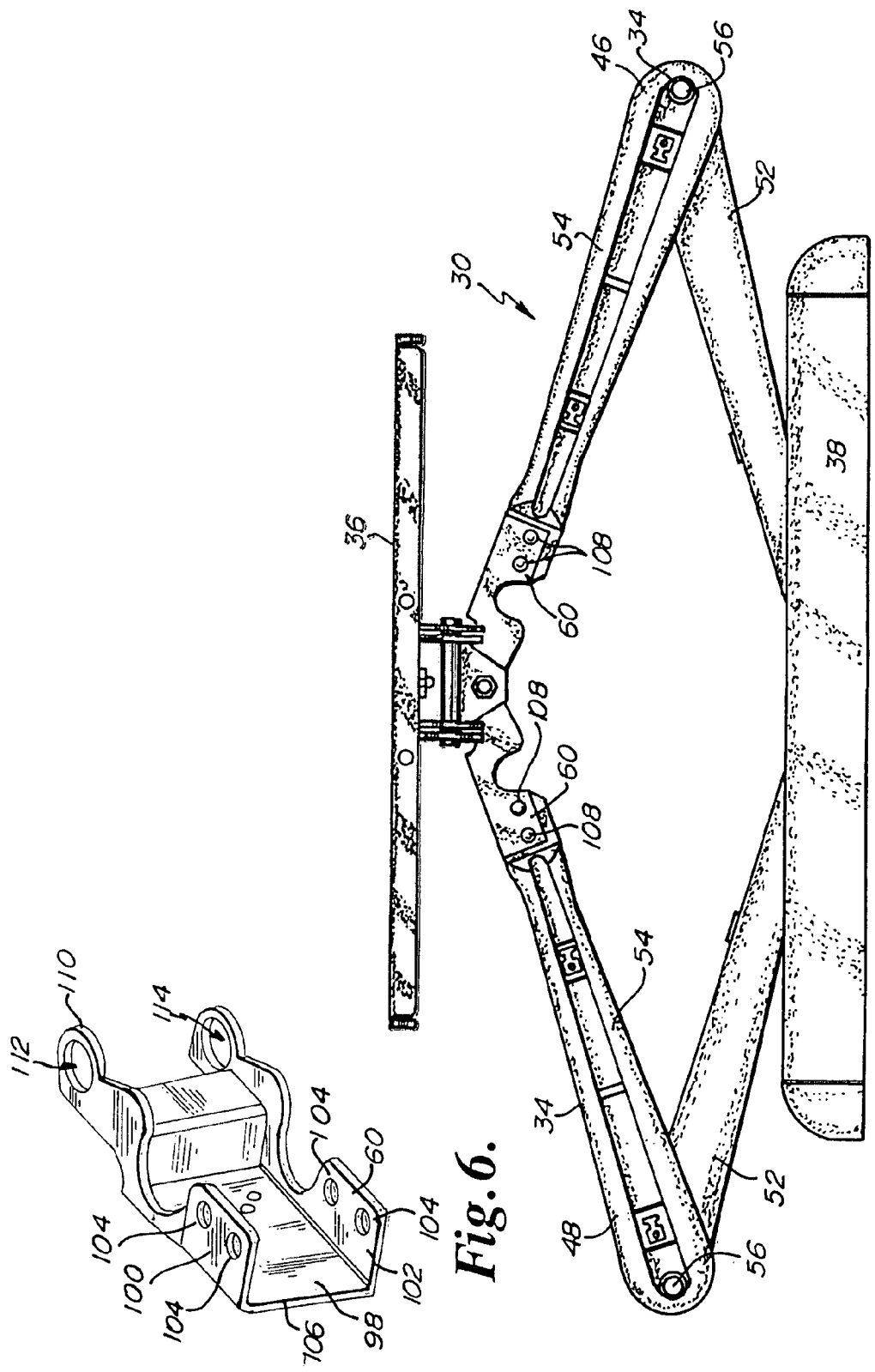

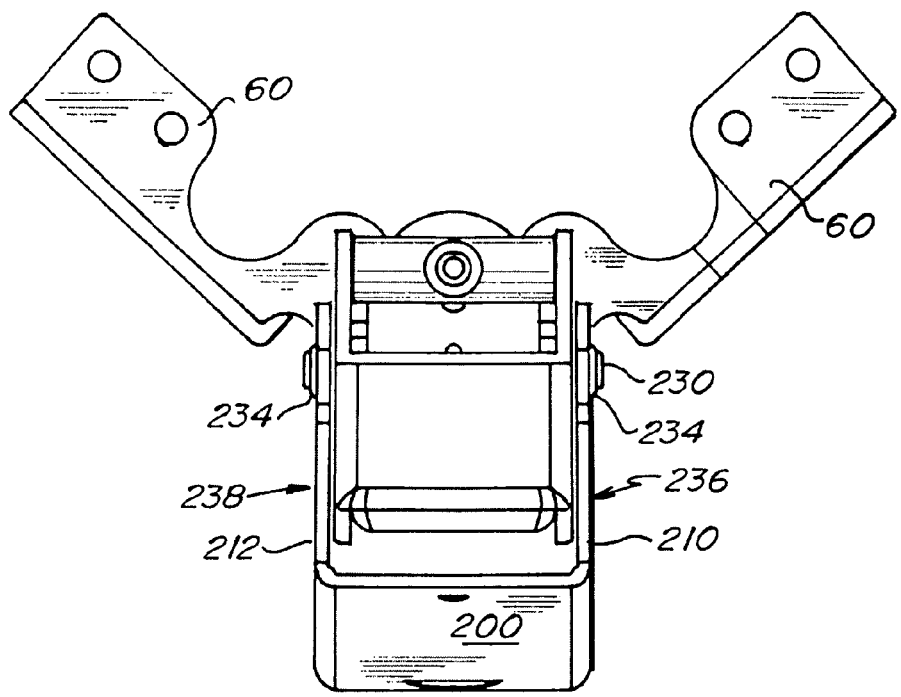
Fig.13a.
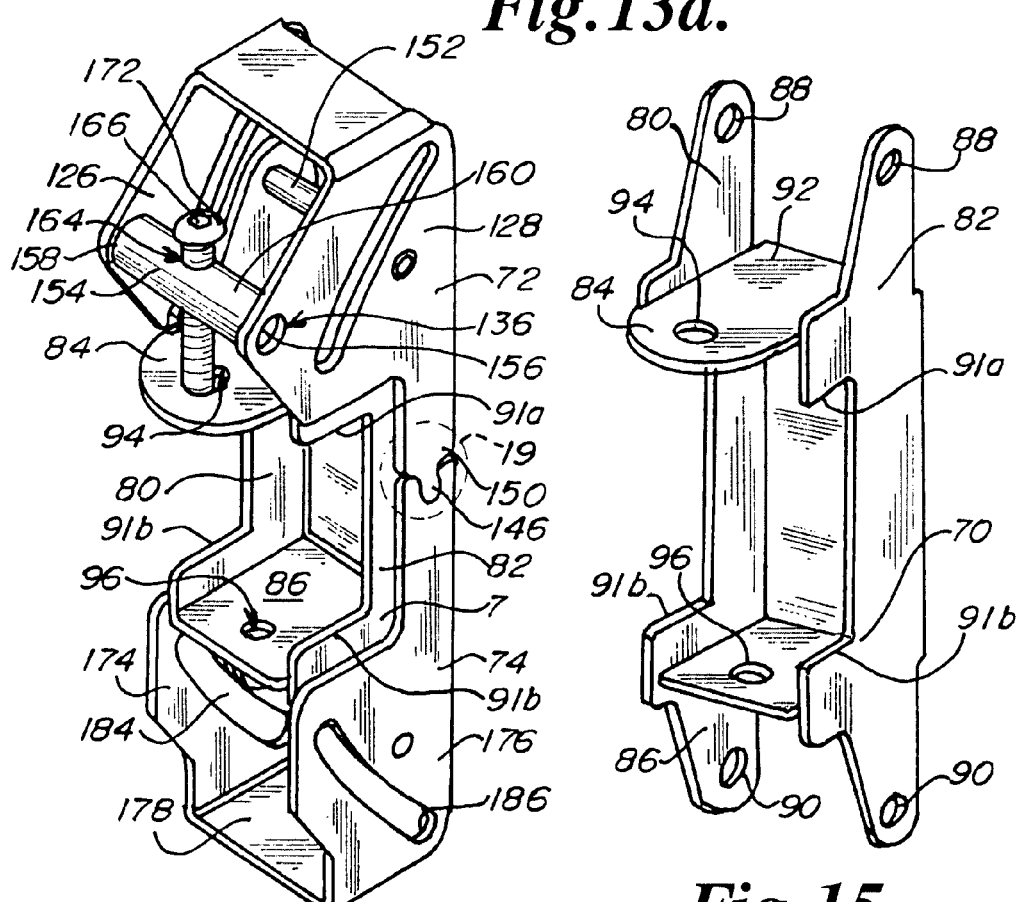
Fig.14.
Fig.15.

DEVICE MOUNT WITH SELECTIVELY POSITIONABLE TILT AXIS

RELATED APPLICATIONS

This application claims the benefit of U.S. Provisional Application No. 60/883,303, filed Jan. 3, 2007, hereby fully incorporated herein by reference.

FIELD OF THE INVENTION

The present invention relates to electronic displays and devices and more particularly to mounting devices for electronic displays and devices.

BACKGROUND OF THE INVENTION

Flat panel electronic display devices such as LCD and plasma displays offer many advantages over conventional CRT and rear projection displays, such as improved picture resolution, elimination of screen flicker, and greatly decreased physical dimensions. Consequently, flat panel displays are becoming commonplace in business and residential settings.

Often, it is desirable to mount a flat panel display from a fixed structure such as a wall, ceiling, column or other structural feature. Consequently, specialized mounts have been developed to enable displays to be mounted from fixed structures, while also enabling selective positioning of the display for visibility or convenience.

Some prior adjustably positionable mounts include various arrangements of brackets and arms to enable tilting of the display screen. Examples of such tilt mounts are disclosed in U.S. Pat. No. 6,752,363 to Boele and U.S. Published Patent Application No. US20020033436A1 by Peng, et. al. A drawback of such simple tilt devices wherein the tilt axis passes through the mount behind the display is that the display tends to tip forward or backward about the tilt axis unless it is held in the desired position with friction or other mechanical locking devices. In that large flat panel display devices, particularly plasma displays, can be quite heavy and unwieldy, it can be difficult for an individual to simultaneously lift the display in the desired position and manipulate the mechanical locking device to fix the display in position.

In other prior mounts, this drawback is overcome by locating the tilt axis of the display within the display itself, preferably proximate the display center of gravity. Such mounting devices are disclosed, for example, in U.S. Pat. Nos. 6,905,101 to Dittmer and 7,028,961 to Dittmer, et. al., each hereby fully incorporated herein by reference.

Due to the wide variations in display configuration it can sometimes be difficult to position the display on these prior mounts so that the tilt axis passes through or proximate the center of gravity so that the display is balanced. If the display is not balanced, it will tend to tip up or down on the mount unless restrained by friction or a locking mechanism, thereby presenting the drawbacks of prior art mounts. Although different mounts can be made for each model display so that the tilt axis is properly positioned for that model, this approach adds manufacturing and production cost and leads to complexity of installation.

What is still needed in the industry is a mount for attaching a variety of makes and models of flat panel electronic displays to a fixed structure that also enables the display to be balanced about its center of gravity so as to be easily manipulated by an individual.

SUMMARY OF THE INVENTION

The present invention addresses the need of the industry for a mount for attaching a variety of makes and models of flat panel electronic displays to a fixed structure that also enables the display to be balanced about its center of gravity so as to be easily manipulated by an individual. In an embodiment of the invention, a mounting system for an electronic display device includes a support structure adapted to attach to a fixed structure and a display interface operably coupled with the support structure. The display interface includes an interface member presenting a display mounting surface for receiving the electronic display thereon, and a tilt head assembly defining a substantially horizontal tilt axis oriented generally parallel with, and spaced apart from, the display mounting surface. When the electronic display device is received on the display mounting surface, the tilt axis extends through the electronic display device. The tilt head assembly includes a control mechanism for selectively shifting the tilt axis between a first location spaced apart a first distance from the display mounting surface and a second location spaced apart a second distance from the display mounting surface, wherein the second distance is greater than the first distance.

In an embodiment of the invention the tilt head assembly of the system includes a first carrier having at least one follower and a first guide member defining a first guide structure positioned along an arc centered on the tilt axis. The at least one follower and the first guide structure are engaged and together define a range of tilt motion about the tilt axis. The control mechanism is operably coupled with the first guide member to selectively shift an orientation of the first guide structure to thereby effect selective shifting of the tilt axis between the first and second locations. The guide structure may be curved, generally straight, angular or any other shape. Moreover, the guide structure may be a slot, groove, channel, ridge, cam edge, or any other structure.

In an embodiment of the invention, the system may include a second guide member defining a second guide structure positioned along the arc centered on the tilt axis. The first carrier includes at least a pair of followers. One of the pair of followers is engaged with the first guide structure and the other of the pair of followers is engaged with the second guide structure. The first and second guide members may be operably coupled such that when the orientation of first guide structure is shifted with the control mechanism, an orientation of the second guide member is also shifted.

In an embodiment of the invention, a mounting system for an electronic display device, includes a support structure adapted to attach to a fixed structure and a display interface operably coupled with the support structure. The display interface generally includes an interface member presenting a display mounting surface for receiving the electronic display thereon and a tilt head assembly defining a substantially horizontal tilt axis forward of the display mounting surface. The tilt head assembly includes means for selectively shifting the tilt axis between a first location spaced apart a first distance from the display mounting surface and a second location spaced apart a second distance from the display mounting surface, wherein the second distance is greater than the first distance.

An embodiment of the invention may also include an electronic display system. The system includes an electronic display device with a front side presenting a display screen and an opposing rear side and a mount for attaching the electronic display device to a fixed structure. The mount includes a support structure adapted to attach to a fixed structure and a display interface operably coupled with the support structure.

The display interface has an interface member presenting a display mounting surface confronting the rear side of the electronic display device and a tilt head assembly defining a substantially horizontal tilt axis oriented generally parallel with and spaced apart from the display mounting surface such that the tilt axis extends through the electronic display device. The tilt head assembly includes a control mechanism for selectively shifting the tilt axis between a first location spaced apart a first distance from the display mounting surface and a second location spaced apart a second distance from the display mounting surface, wherein the second distance is greater than the first distance.

An embodiment of the invention may also include a method for mounting an electronic display on a fixed structure with a mount defining a virtual tilt axis forward of the mount. The method may include adjusting the mount to shift the location of the virtual tilt axis so as to coincide with the center of gravity of the electronic display.

BRIEF DESCRIPTION OF THE DRAWINGS

FIG. 6 is a rear perspective view of one of the attachment channels depicted in FIGS. 4 and 5;

FIG. 7 is a top plan view of the electronic display mount of FIG. 1;

FIG. 13a is a fragmentary top plan view of the mount of FIG. 8;

FIG. 14 is a rear perspective view of the mount of FIG. 8 without the follower member and follower pins;

FIG. 15 is a rear perspective view of the carrier portion of the mount of FIG. 8;

DETAILED DESCRIPTION OF THE PREFERRED EMBODIMENTS

Figure 1:
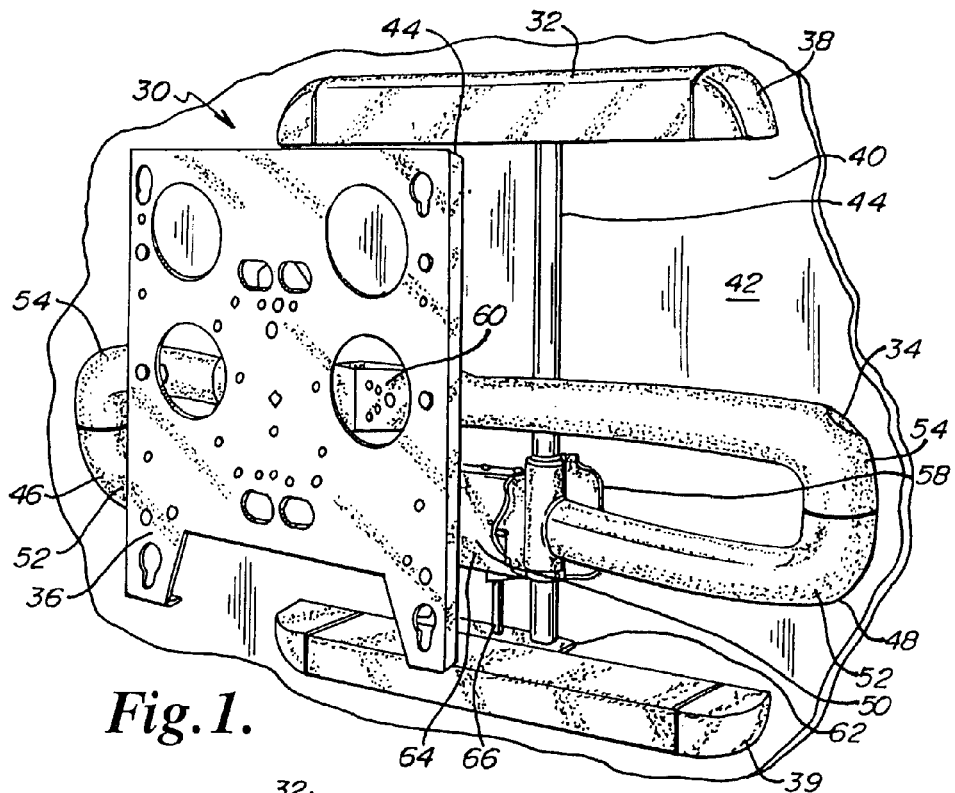
FIG. 1 is a front perspective view of an electronic display mount according to an embodiment of the invention.
Figure 2:
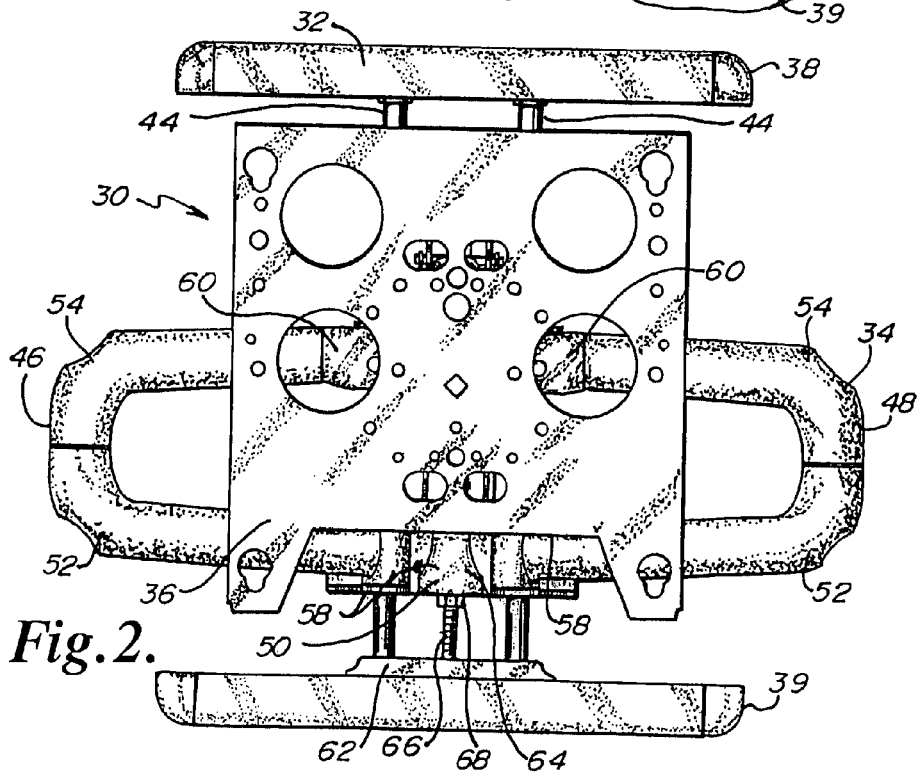
FIG. 2 is a front elevation view of the mount of FIG. 1.
Figure 3:
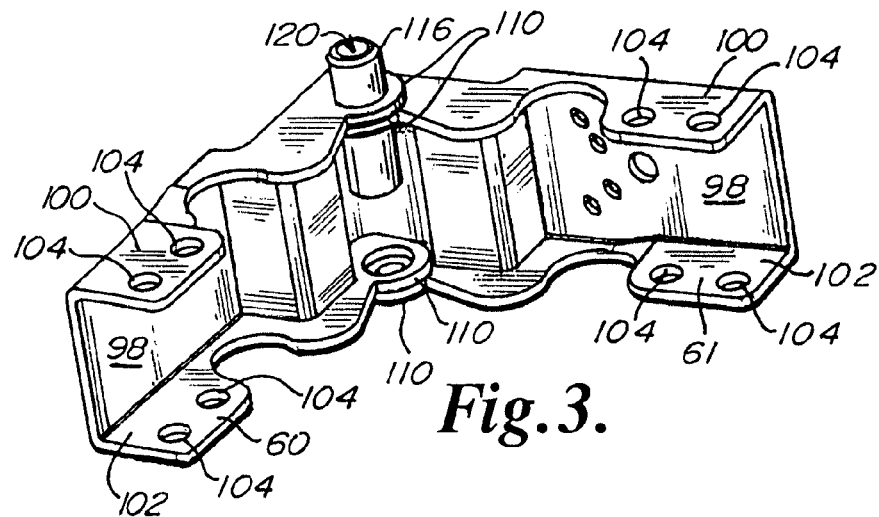
FIG. 3 is a fragmentary perspective view of an attachment channel assembly of an electronic display mount according to an embodiment of the invention.

Electronic display mount 30 according to an embodiment of the present invention is depicted in FIGS. 1-3. Mount 30 generally includes structure interface 32, cantilever support 34 and device interface 36. Structure interface 32 generally includes mounting bars 38, 39, which attach to fixed structure 40 such as planar wall surface 42, and upright columns 44 extending between mounting bars 38, 39.

Cantilever support 34 generally includes articulating arm assemblies 46, 48, and height adjustment mechanism 50. Each articulating arm assembly 46, 48, generally includes lower arm 52 and upper arm 54 connected at pivot 56. Each lower arm 52 includes sleeve 58 received on one of upright columns 44 and vertically slidable thereon. Height adjustment mechanism 50 generally includes base portion 62 on mounting bar 39 and upper portion 64 operably coupled with sleeves 58. Threaded coupler 66 extends between base portion 62 and upper portion 64 and receives jacking nut 68, which bears on the underside of upper portion 64. In use, articulating arm assemblies may be translated together vertically by rotating jacking nut 68 up or down on threaded coupler 66, thereby sliding upper portion 64 and sleeves 58 up or down on upright columns 44. Further details of embodiments of structure interface 32 and cantilever support 34 are disclosed in U.S. patent application Ser. No. 11/447,226, hereby fully incorporated herein by reference.

Device interface 36, in an embodiment depicted in FIGS. 8-18, generally includes carrier 70, upper guide member 72, lower guide member 74, follower member 76, and interface plate 78. Carrier 70 generally includes back plane 79 with spaced-apart lateral flanges 80, 82, and spaced apart horizontal flanges 84, 86, projecting therefrom. Upper aperture 88 and lower aperture 90 are defined in lateral flange 80 in registry with corresponding upper and lower apertures 88, 90, defined in lateral flange 82. Each lateral flange 80, 82, defines a pair of facing shoulders 91a, 91b. Horizontal flange 84 defines round aperture 92 and oblong aperture 94, while horizontal flange 86 defines round aperture 96 in registry with aperture 92.

As depicted in FIGS. 3-6, attachment channels 60, 61, generally include back wall 98 with projecting upper and lower flanges 100, 102, respectively. Apertures 104 are defined in each of upper and lower flanges 100, 102 proximate outer end 106, each for receiving a fastener 108 to fix each attachment channel 60, 61, to one of upper arms 54. Proximate inner end 110, upper flange 100 defines aperture 112 in registry with aperture 114 defined in lower flange 102.

Figure 4:
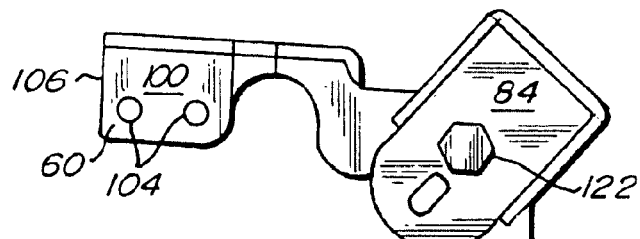
FIG. 4 is a top plan view of the attachment channel assembly of FIG. 3 coupled with a carrier portion of a mount according to an embodiment of the invention.
Figure 5:
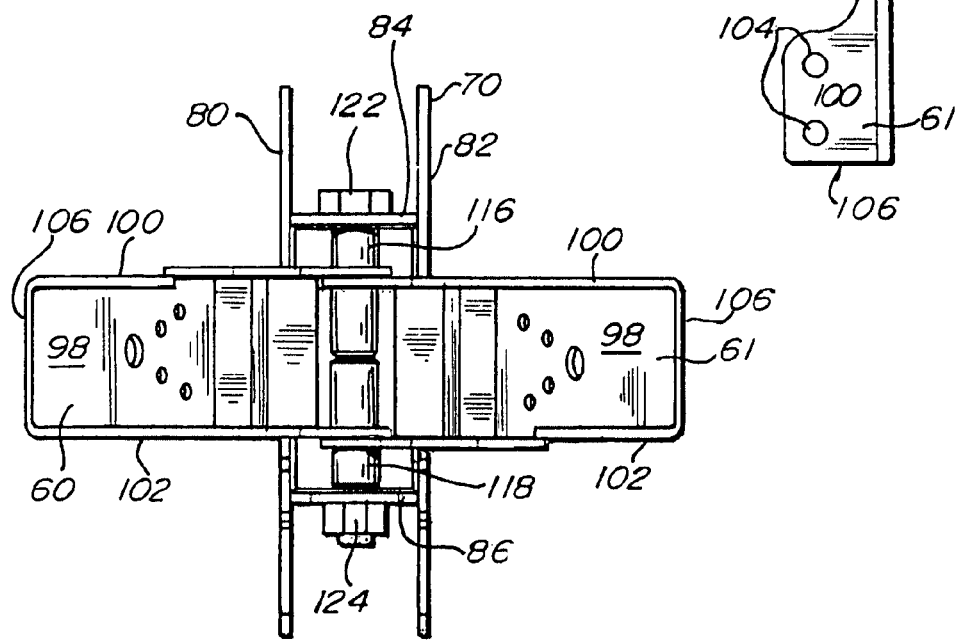
FIG. 5 is a rear elevation view of the attachment channel assembly and carrier portion of FIG. 4.
Figure 8:
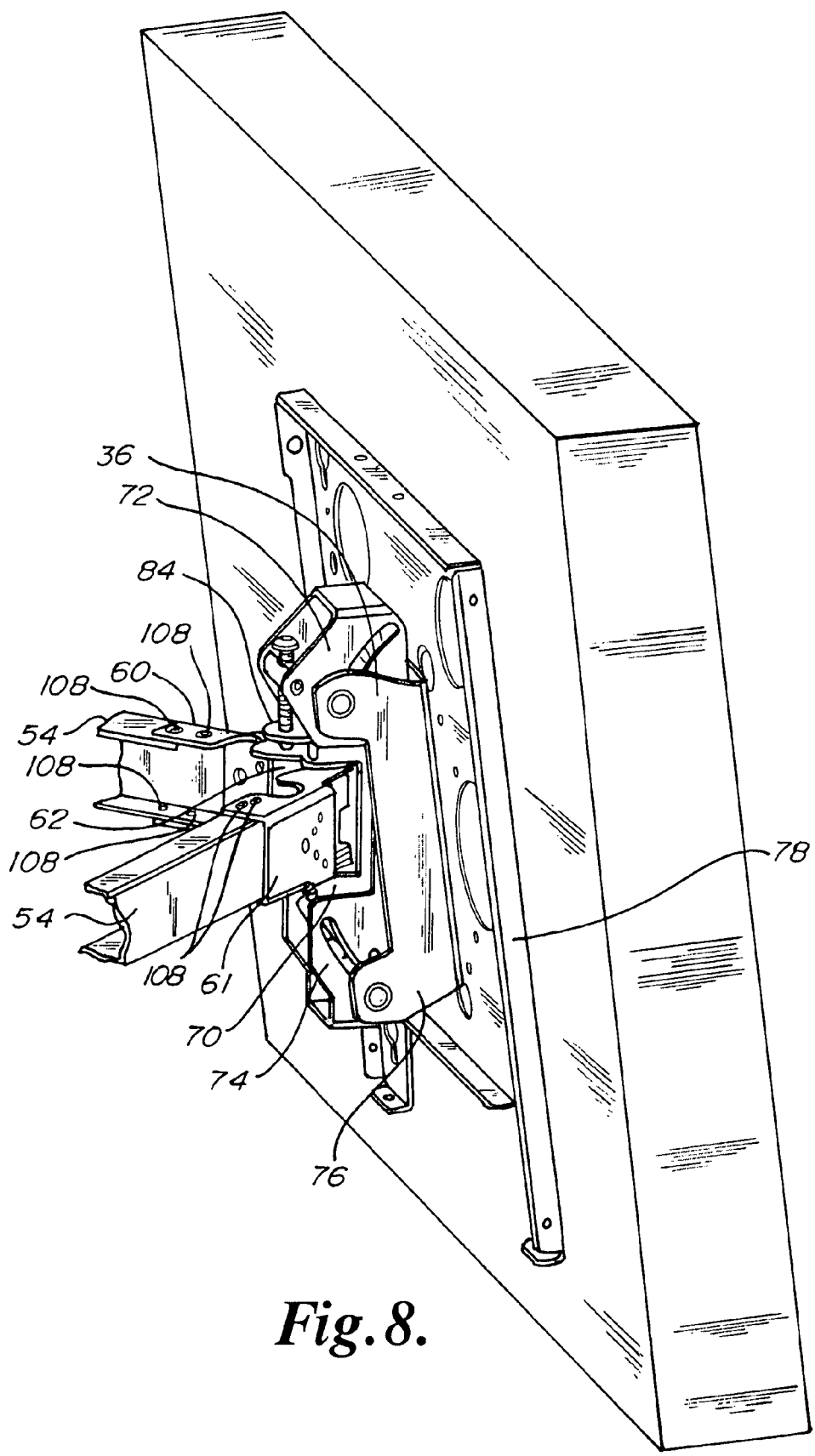
FIG. 8 is a rear perspective view of the display interface portion of a mount according to an embodiment of the invention coupled with an electronic display device.

As depicted in FIGS. 3-5, inner ends 110 of attachment channels 60, 61, are positioned so as to overlap, with apertures 112 and 114 in registry. Bushing 116 is received through apertures 112 and bushing 118 is received through apertures 114. Bushings 116, 118, together define bore 120, which is disposed in registry with apertures 92, 96, in horizontal flanges 84, 86 of carrier 70. Bolt 122 is received through apertures 92, 96, and bore 120, and is secured in place with nut 124. Attachment channel 60 is received between facing shoulders 91a, 91b, of lateral flange 80 with upper flange 100 confronting shoulder 91a and lower flange 102 confronting shoulder 91b.

In use, carrier 70, and each of attachment channels 60, 61, and the upper arms 54 attached thereto are pivotable about bolt 122. Accordingly, a user may push or pull on device interface 36, which causes arms 52, 54, to pivot at sleeves 58, pivot 56 and at bolt 122. The articulating arrangement of arms 52, 54, and the pivotal connections of sleeves 58 with upright columns 44 of attachment channels 60, 61, with carrier 70 at bolt 122, enable the device interface and a display attached thereto to be selectively positioned laterally and inward and outward relative to the fixed structure 40.

Referring again now to FIGS. 13-18, upper guide member 72 generally includes a pair of lateral walls 126, 128, connected by upper wall 130. Lateral wall 126 defines apertures 132, 134, in registry with apertures 136, 138, respectively, defined in lateral wall 128. Each lateral wall 126, 128, also defines a guide structure in the form of a slot 140, 142. Further, positioning tabs 144, 146, are defined at the bottom tips 148, 150, of each of lateral walls 126, 128 respectively.

Pivot pin 152 extends through upper apertures 88 of carrier 70 and apertures 134, 138, of upper guide member 72 to pivotally couple upper guide member 72 to carrier 70 about pivot pin 152. Adjustment carrier pin 154 has an axial bore 156 with interior threads extending inward from each end 158, 160. Threaded fasteners 162 extend inward through apertures 132, 136, and thread into axial bore 156 to rotatably couple adjustment carrier pin 154 between lateral walls 126, 128. Adjustment carrier pin 154 further defines transverse bore 164 with interior threading receiving adjustment screw 166 therethrough. Adjustment screw 166 extends downward through oblong aperture 94 in carrier 70. Nut 168 is fixed on adjustment screw 166 to prevent adjustment screw 166 from being withdrawn from oblong aperture 94.

Figure 13:
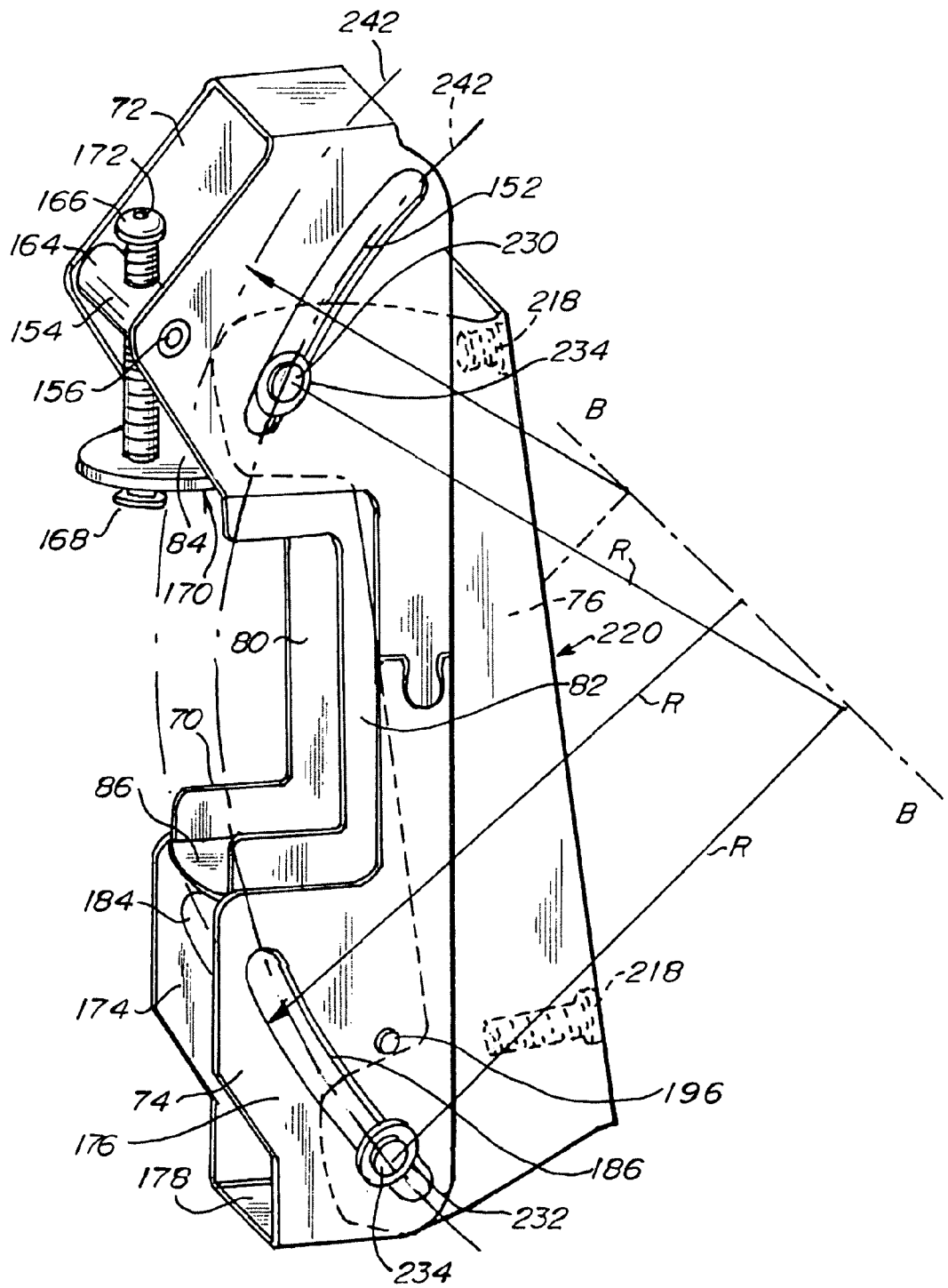
FIG. 13 is a rear perspective view of the mount of FIG. 8 with the follower member depicted in phantom to enable viewing of the upper and lower guide members.
Figure 16:
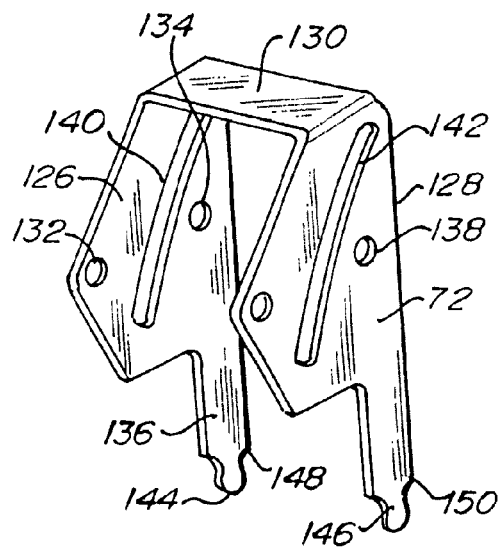
FIG. 16 is a rear perspective view of the upper guide member portion of the mount of FIG. 8.

Referring now to FIG. 13, it will be appreciated that when adjustment screw 166 is tightened, nut 168 will slidingly rotate against the underside 170 of horizontal flange 84, and since nut 168 is fixed onto adjustment screw 166, adjustment screw 166 will not vertically translate relative to carrier 70. As adjustment screw 166 threads into adjustment carrier pin 154, however, adjustment carrier pin 154 is drawn closer to head 172, causing upper guide member 72 to pivot about pivot pin 152 in a clockwise direction when viewed from the perspective of FIG. 13. Similarly, when adjustment screw 166 is loosened, adjustment carrier pin 154 is pushed away from head 172, causing guide member 72 to pivot about pivot pin 152 in a counterclockwise direction when viewed from the perspective of FIG. 13.

Figure 17:
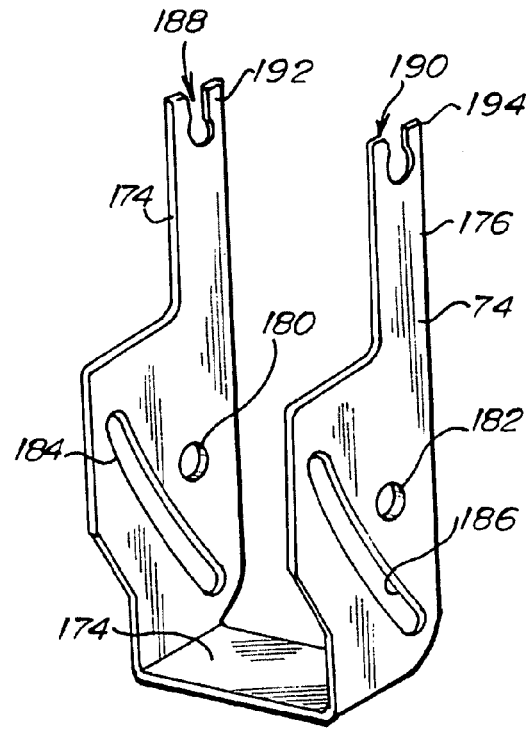
FIG. 17 is a rear perspective view of the lower guide member portion of the mount of FIG. 8.
Figure 20:
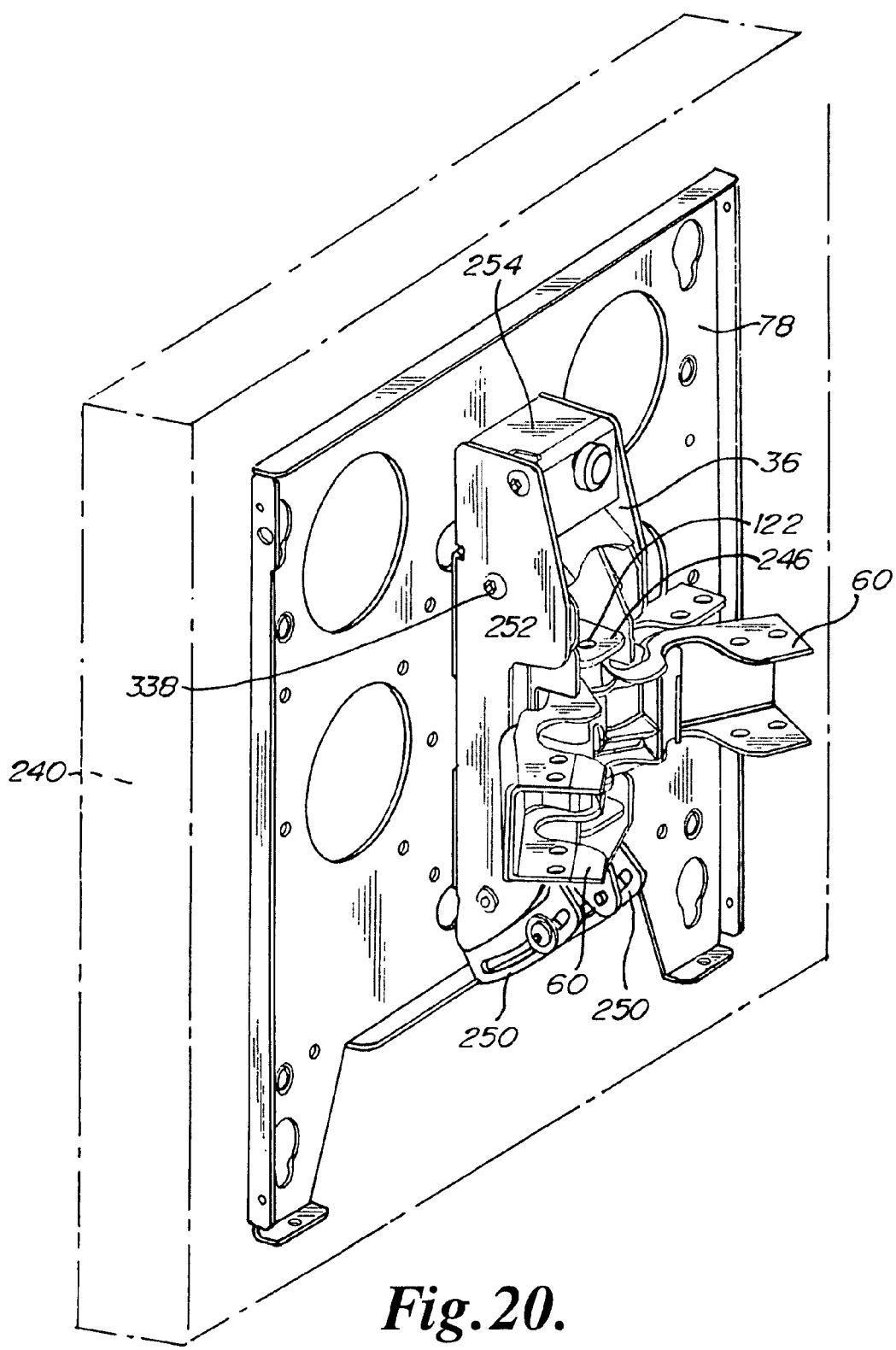
FIG. 20 is a rear perspective view of the display interface portion of a mount according to an alternative embodiment of the invention, coupled with an electronic display device.
Figure 21:
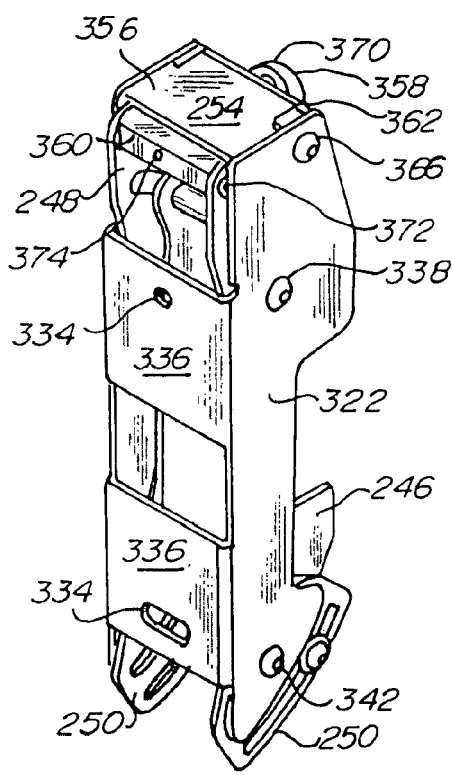
FIG. 21 is a fragmentary front perspective view of the display interface portion of the mount of FIG. 20 depicted without an interface plate.
Figure 22:
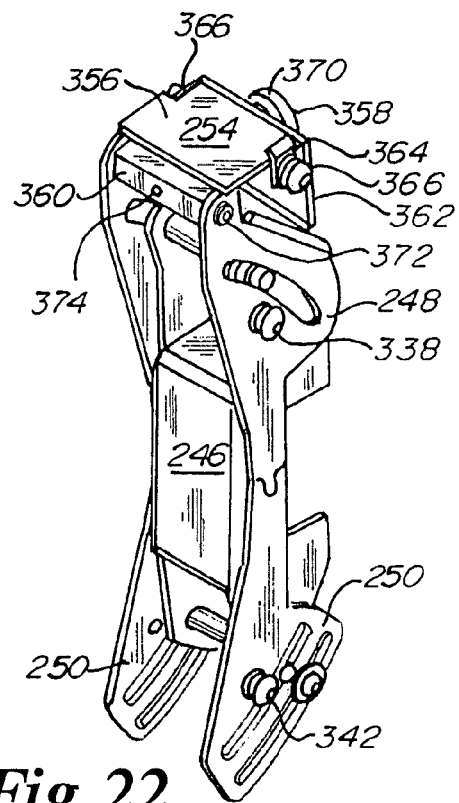
FIG. 22 is a fragmentary front perspective view of the mount of FIG. 21 depicted without an interface plate and outer carrier.

Lower guide member 74, as depicted in FIG. 17, generally includes a pair of lateral walls 174, 176, connected by lower wall 178. Lateral wall 174 defines aperture 180 in registry with aperture 182 defined in lateral wall 176. Each lateral wall 174, 176, also defines a guide structure in the form of a slot 184, 186. Further, positioning notches 188, 190, are defined at the upper tips 192, 194, of each of lateral walls 174, 176, respectively.

Pivot pin 196 extends through lower apertures 90 of carrier 70 and apertures 180, 182, of lower guide member 74 to pivotally couple lower guide member 74 to carrier 70 about pivot pin 196. Positioning tabs 144, 146, of upper guide member 72 engage in positioning notches 188, 190, respectively, so that as upper guide member 72 pivots, lower guide member 74 pivots a corresponding distance in the opposite pivotal direction.

Figure 19:
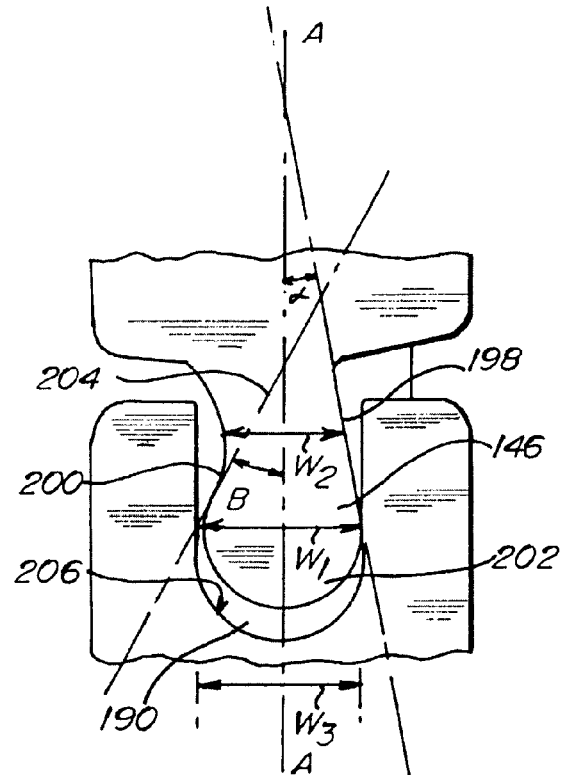
FIG. 19 is a side elevation view of a positioning tab and positioning notch taken at inset 19 of FIG. 14.

The engagement of positioning tab 146 in positioning notch 190 in a exemplary embodiment is depicted in FIG. 19. Front edge 198 of positioning tab 146 is angled at angle α with respect to the longitudinal axis A-A of lateral wall 128, while rear edge 200 may be angled at angle β, so that positioning tab 146 has a lower portion 202 presenting a first width $W_1$, and an upper neck portion 204 presenting a second width $W_2$ smaller than first width $W_1$. First width $W_1$ may be only slightly smaller than the width $W_3$ of positioning notch 190 so that front edge 198 and rear edge 200 of positioning tab 146 smoothly engage inner periphery 206 of positioning notch 190 as upper guide structure 72 and lower guide structure 74 rotate with respect to each other. Second width $W_2$ is selected so as to enable a desired range of rotation of positioning tab 146 within positioning notch 190. Moreover, angles α and β may be different from each other where more rotational range is desired in one rotational direction. For example, in one embodiment, angle α may be in a range from about 1 to about 10 degrees, while angle β is in a range from about 5 to about 20 degrees. In another embodiment angle α may be about 5 degrees while angle β is about 10 degrees.

Figure 18:
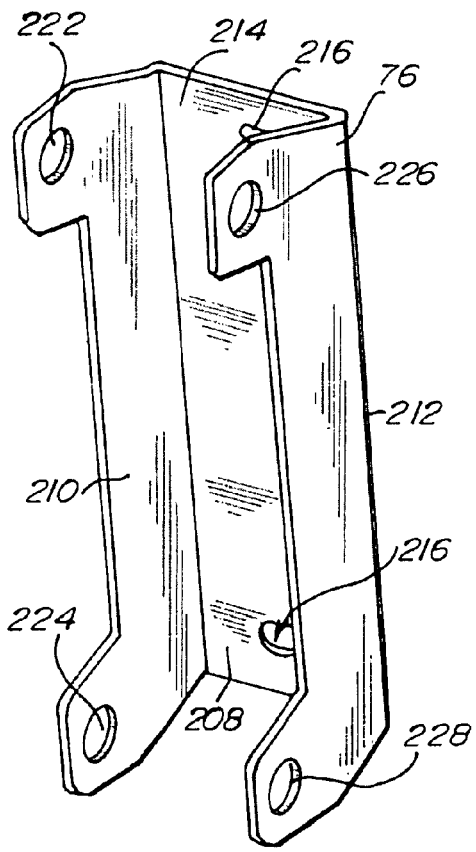
FIG. 18 is a rear perspective view of the follower member portion of the mount of FIG. 8.

Follower member 76, as depicted in FIG. 18, generally includes web 208 and a pair of spaced apart lateral walls 210, 212, defining a channel 214. Web 208 defines apertures 216 for receiving fasteners 218 to attach interface plate 78 on outer face 220 of web 208. Lateral wall 210 defines upper aperture 222 and lower aperture 224 in registry with upper aperture 226 and lower aperture 228, respectively, defined in lateral wall 212.

Figure 9:
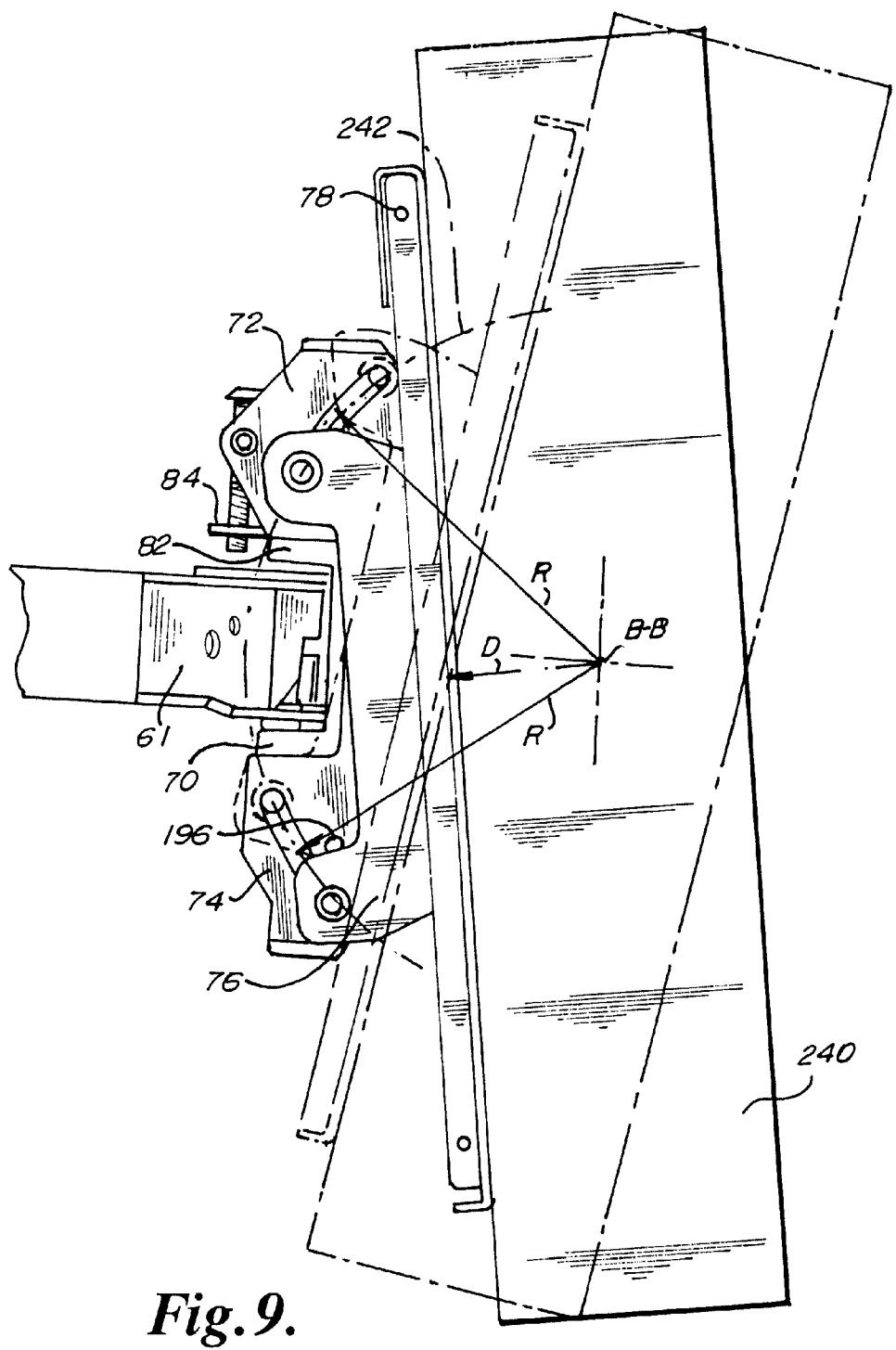
FIG. 9 is a fragmentary side elevation view of the mount and display of FIG. 8, depicting the display being selectively tilted about a tilt axis B-B.

Upper follower pin 230 extends through upper apertures 222, 226, and slots 140, 142, while lower follower pin 232 extends through lower apertures 224, 228, and slots 184, 186. As depicted in the top view of FIG. 13a, upper 230 and lower 232 follower pins are retained in position with retainers 234 on opposing ends of the pins, facing the outer surfaces 236, 238, of lateral walls 210, 212. Upper and lower follower pins 230, 232, are slidable or rollable in slots 140, 142, and 184, 186, thereby enabling follower member 76, interface plate 78 and an attached electronic display 240 or other device to tilt relative to carrier 70 and ultimately fixed structure 40 as depicted in FIG. 9.

Advantageously, slots 140, 184, and 142, 186, are positioned along arcs 242 of a circle centered on a generally horizontal tilt axis annotated B-B in the Figures. Tilt axis B-B extends through electronic display 240 at a distance D in front of interface plate 78, as depicted in FIG. 9. Display 240 may be tilted about tilt axis B-B, for example by pushing or pulling the top or bottom edge of the display 240. Upper and lower follower pins 230, 232, will slide or roll in slots 140, 142, and 184, 186, and follower member 76, interface plate 78 and the attached electronic display 240 will rotate about tilt axis B-B.

Figure 10:
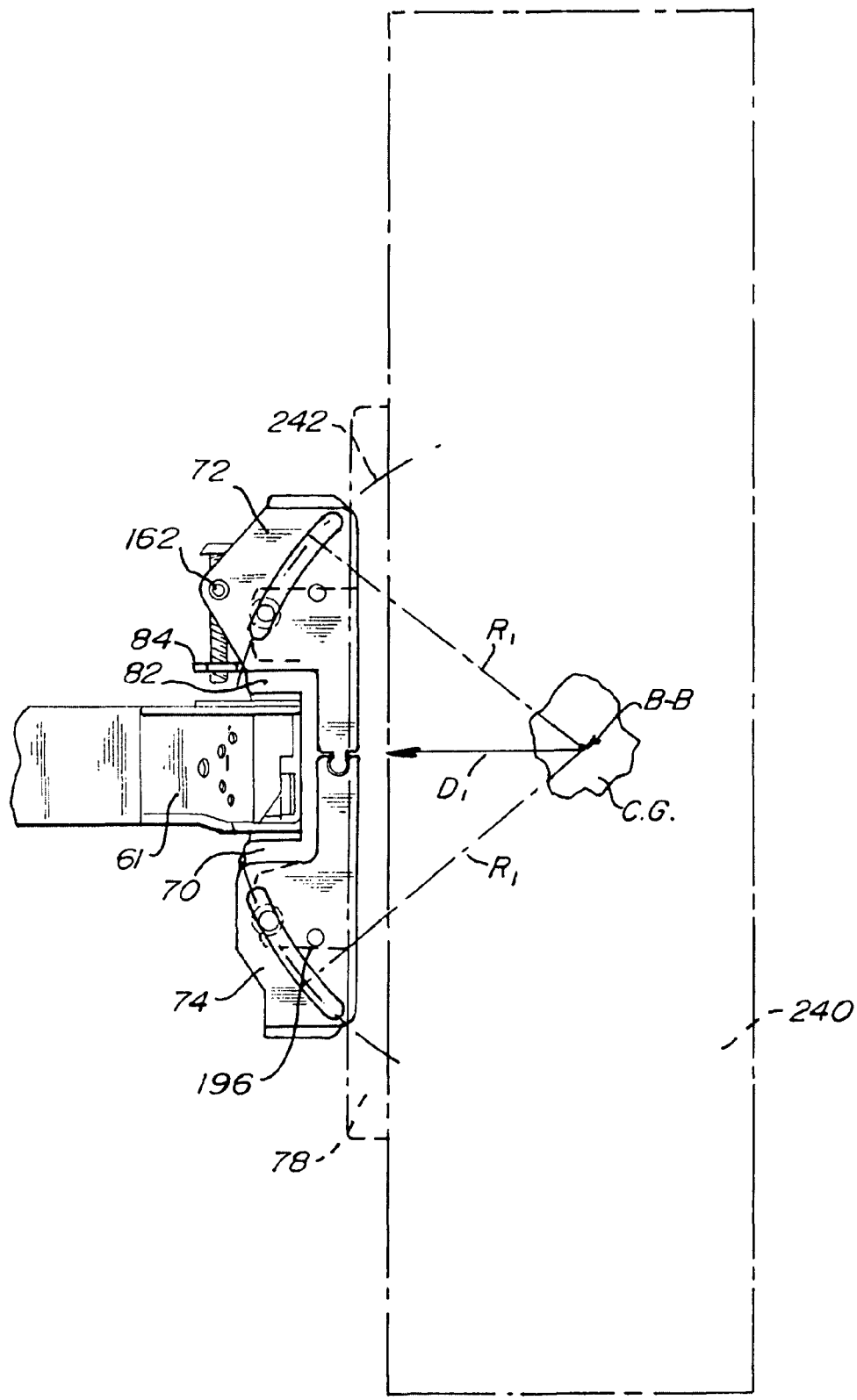
FIG. 10 is a fragmentary side elevation view of the mount and display of FIG. 8 with the follower member, interface plate and display depicted in phantom and with the tilt axis positioned in a first location at a first distance from the interface plate.
Figure 11:
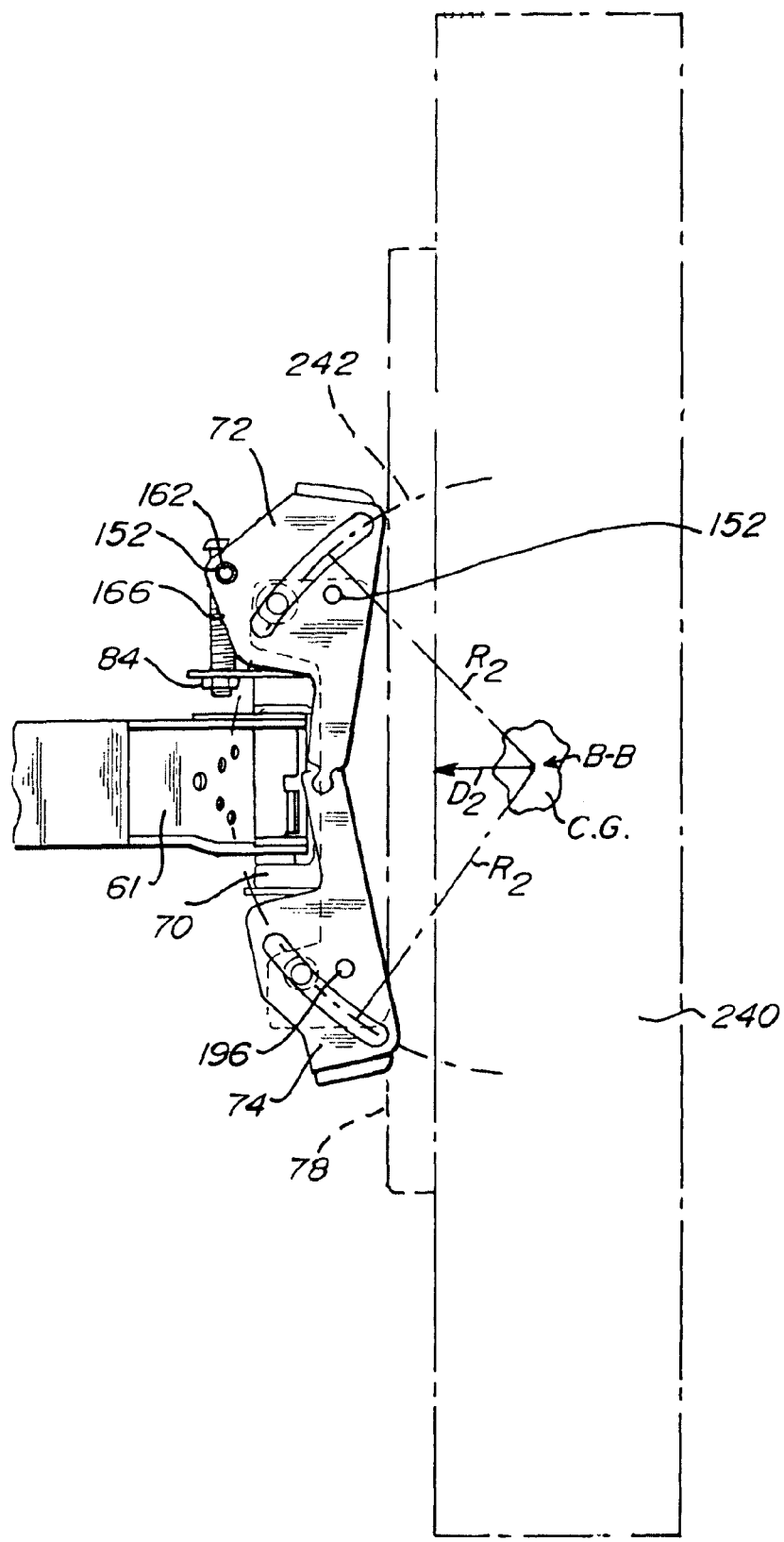
FIG. 11 is a fragmentary side elevation view of the mount and display of FIG. 8 with the follower member, interface plate and display depicted in phantom and with the tilt axis positioned in a second location at a second distance from the interface plate.
Figure 12:
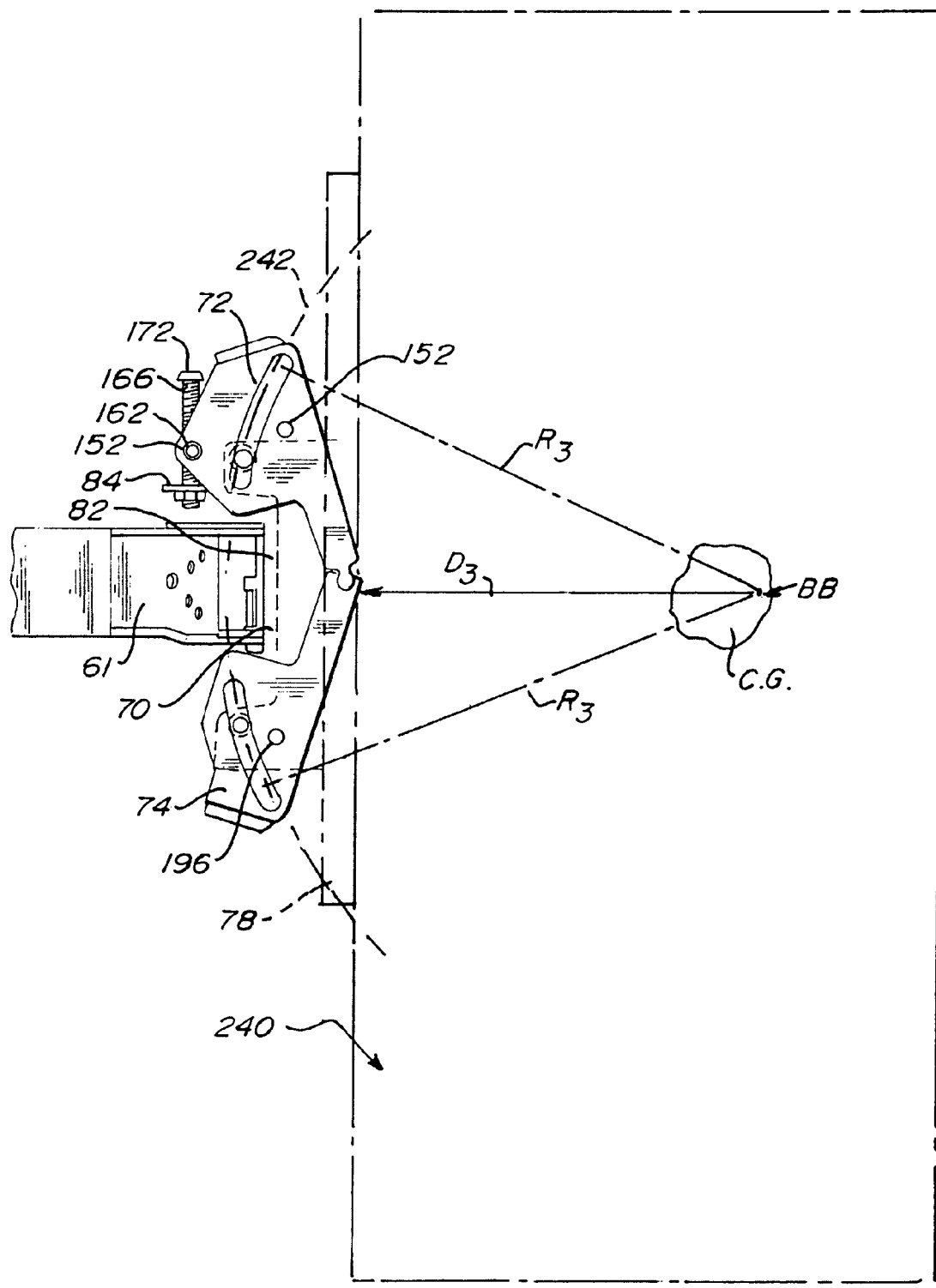
FIG. 12 is a fragmentary side elevation view of the mount and display of FIG. 8 with the follower member, interface plate and display depicted in phantom and with the tilt axis positioned in a third location at a third distance from the interface plate.

Referring now to FIGS. 10-12, it will be understood that according to embodiments of the invention, the position of tilt axis B-B, and in particular the magnitude of distance D, may be selectively adjusted with adjustment screw 166. In FIG. 10, upper guide member 72 and lower guide member 74 are positioned intermediate the travel limits of the mechanism. Slots 140, 184, and 142, 186, are positioned along arcs 242 of a circle having radius $R_1$ and centered on tilt axis B-B. Tilt axis B-B is positioned at distance $D_1$ from interface plate 78.

As depicted in FIG. 11, when adjustment screw 166 is tightened, adjustment carrier pin 154 is drawn closer to head 172, causing upper guide member 72 to pivot about pivot pin 152 in a clockwise direction when viewed from the vantage point of FIG. 11. Due to the engagement of positioning tab 146 in positioning notch 190, lower guide member 74 is simultaneously pivoted counterclockwise about pivot pin 196 when viewed from the vantage point of FIG. 11. As a result of the pivoting motion of upper guide member 72 and lower guide member 74, the orientation of slots 140, 184, and 142, 184, is altered so as to define new arcs 242 having radius $R_2$ less than radius $R_1$. Tilt Axis B-B is moved closer to interface plate 78, defining a new distance $D_2$ less than distance $D_1$.

When adjustment screw 166 is loosened as depicted in FIG. 12, adjustment carrier pin 154 is urged away from head 172, causing upper guide member 72 to pivot about pivot pin 152 in a counterclockwise direction when viewed from the vantage point of FIG. 12. Due to the engagement of positioning tab 146 in positioning notch 190, lower guide member 74 is simultaneously pivoted clockwise about pivot pin 196 when viewed from the vantage point of FIG. 12. As a result of the pivoting motion of upper guide member 72 and lower guide member 74, the orientation of slots 140, 184, and 142, 184, is altered so as to define new arcs 242 having radius $R_3$ greater than radius $R_1$. Tilt Axis B-B is moved away from interface plate 78, defining a new distance $D_3$ greater than distance $D_1$.

It will be appreciated that, according to embodiments of the invention, tilt axis B-B may be selectively positioned to coincide with or pass proximate the center of gravity C.G. of an electronic display 240 so that display 240 or other device mounted to interface plate 78 may be tilted in either rotational direction about tilt axis B-B with approximately equal effort. The ability to shift the location of tilt axis B-B relative to interface plate 78 according to embodiments of the invention is particularly advantageous in that displays 240 of a variety of thicknesses and with a variety of center of gravity locations can be accommodated with the same device interface 36. For example, as depicted in FIG. 11, the location of tilt axis B-B may be adjusted to coincide with the center of gravity C.G. of a relatively thin display device 240. In the example depicted in FIG. 12, a relatively thicker display device or one in which the center of gravity C.G. is a different distance from interface plate 78 may also be accommodated on the same mount and balanced for lower tilt effort by adjusting the location of tilt axis B-B to coincide with the center of gravity C.G. of the device 240 with adjustment screw 166.

Figure 9A:
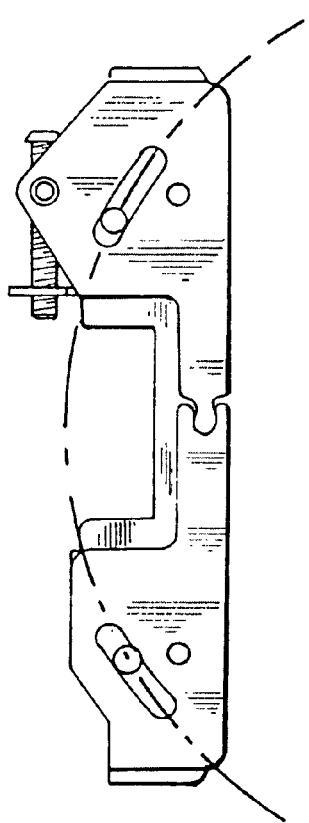
FIG. 9a is a fragmentary side elevation view of a portion of the guide member and carrier portions of a mount according to an alternative embodiment of the invention.
Figure 9B:
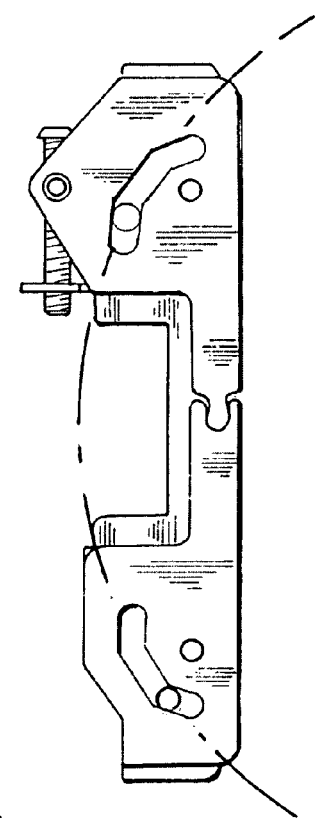
FIG. 9b is a fragmentary side elevation view of a portion of the guide member and carrier portions of a mount according to another alternative embodiment of the invention.

In the embodiment depicted in FIGS. 1-19, multiple guide structures are provided in the form of slots 140, 184, and 142, 186. It will be appreciated by those of skill in the art, however, that the present invention is not limited to any particular guide structure form, and that other guide structures, such as channels, grooves, ridges, or cam edges, coupled with compatible follower structures may also be used. Moreover, although the guide structures are desirably curved to provide smooth operation for the mechanism, the guide structures may also be straight as depicted for example in FIG. 9a, angular as depicted for example in FIG. 9b, or any other shape capable of defining a generally arcuate path either alone or in combination with other guide structures.

Figure 9C:
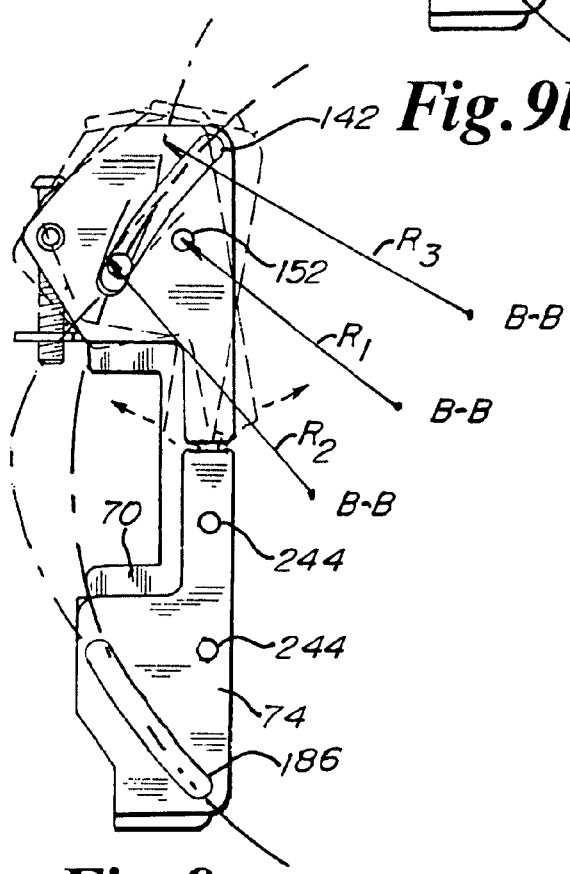
FIG. 9c is a fragmentary side elevation view of a portion of the guide member and carrier portions of a mount according to another alternative embodiment of the invention.

It will further be appreciated that, in some embodiments, one or more of the guide structures may be fixed in position so long as at least one guide structure is selectively shiftable to effect shifting of the tilt axis. For example, in the embodiment of FIG. 9c, lower guide structure 74 is fixed to carrier 70 with rivets 244, while upper guide structure 72 is selectively pivotable about pivot pin 152 as before. As the orientation of guide structures 140, 142, shifts with rotation of upper guide structure 72, arcs 242 of varying radii (for example $R_1$, $R_2$ or $R_3$) are defined by guide structures 140, 184, and 142, 186. In that lower guide structure 74 is fixed in position, however, the orientation of guide structures 184, 186, remains fixed causing a general tendency of the resultant tilt axis to shift vertically as well as horizontally as depicted.

Figure 23:
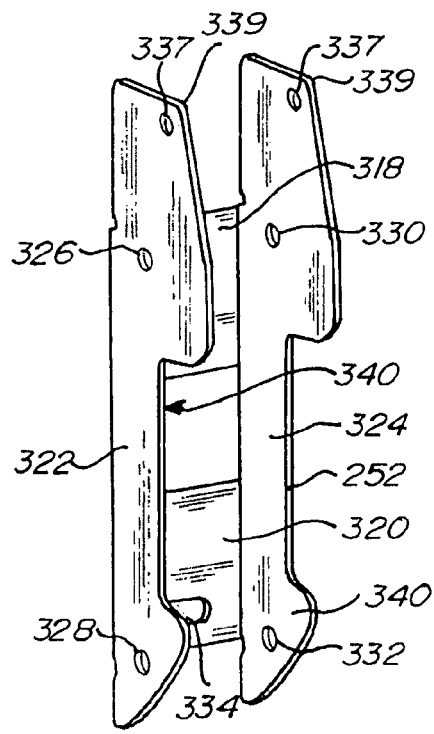
FIG. 23 is a rear perspective view of the outer carrier portion of the mount of FIG. 20.
Figure 24:
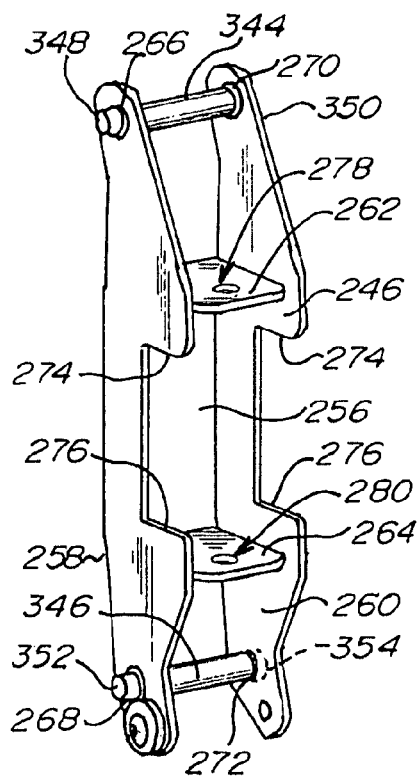
FIG. 24 is a rear perspective view of the inner carrier portion of the mount of FIG. 20.

In an alternative embodiment of the invention depicted in FIGS. 20-28, device interface 36 generally includes inner carrier 246, upper guide structure 248, a pair of lower guide structures 250, outer carrier 252, and adjustment assembly 254. Inner carrier 246 as depicted in FIG. 24, generally includes back plane 256 with spaced-apart lateral flanges 258, 260, and spaced apart horizontal flanges 262, 264, projecting therefrom. Upper follower aperture 266 and lower follower aperture 268 are defined in lateral flange 258 in registry with corresponding upper and lower follower apertures 270, 272, defined in lateral flange 260. Each lateral flange 258, 260, defines a pair of facing shoulders 274, 276. Horizontal flange 262 defines aperture 278 while horizontal flange 264 defines aperture 280 in registry with aperture 278.

As before, inner ends 110 of attachment channels 60, 61, are positioned so as to overlap, with apertures 112 and 114 in registry. Bushing 116 is received through apertures 112 and bushing 118 is received through apertures 114. Bushings 116, 118, together define bore 120, which is disposed in registry with apertures 278, 280, in horizontal flanges 262, 264, of inner carrier 246. Again, bolt 122 is received through apertures 278, 280, and bore 120, and is secured in place with a nut (not depicted). Attachment channel 60 is received between facing shoulders 274, 276, of lateral flanges 258, 260, with upper flange 100 confronting shoulder 274 and lower flange 102 confronting shoulder 276.

In use, inner carrier 246, and each of attachment channels 60, 61, and the upper arms 54 attached thereto are pivotable about bolt 122. Accordingly, a user may push or pull on device interface 36, which causes arms 52, 54, to pivot at sleeves 58, pivot 56 and at bolt 122. The articulating arrangement of arms 52, 54, and the pivotal connections of sleeves 58 with upright columns 44 of attachment channels 60, 61, with carrier 70 at bolt 122, enable the device interface and a display attached thereto to be selectively positioned laterally and inward and outward relative to the fixed structure 40.

Figure 25:
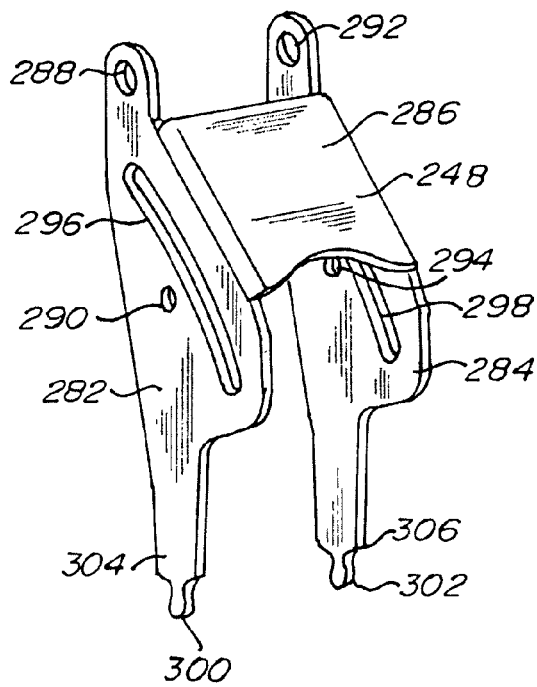
FIG. 25 is a rear perspective view of the upper guide member portion of the mount of FIG. 20.

As depicted in FIG. 25, upper guide member 248 generally includes a pair of lateral walls 282, 284, connected by upper wall 286. Lateral wall 282 defines apertures 288, 290, in registry with apertures 292, 294, respectively, defined in lateral wall 284. Each lateral wall 282, 284, also defines a guide structure in the form of a slot 296, 298. Positioning tabs 300, 302, are defined at the bottom tips 304, 306, of each of lateral walls 282, 284, respectively.

Figure 26:
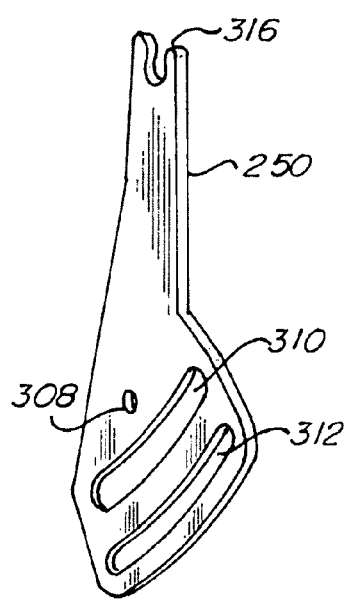
FIG. 26 is a rear perspective view of one of the lower guide member portions of the mount of FIG. 20.

Lower guide member 250, as depicted in FIG. 26, defines aperture 308, a guide structure in the form of slot 310 and a friction adjustment slot 312. Positioning notch 314 is defined at upper tip 316.

Outer carrier 252 as depicted in FIG. 23, generally includes back portions 318, 320, with spaced-apart lateral flanges 322, 324, projecting therefrom. Upper pivot aperture 326 and lower pivot aperture 328 are defined in lateral flange 322 in registry with corresponding upper and lower pivot apertures 330, 332, defined in lateral flange 324. Back portions 318, 320, define apertures 334 for receiving fasteners (not depicted) to attach interface plate 78 on outer faces 336 of back portions 318, 320. Apertures 337 are defined at the upper tip 339 of each lateral flange 322, 324.

Upper guide member 248 is pivotally coupled to outer carrier 252 between lateral flanges 322, 324, at pivots 338 which extend inward from the outer surface of lateral flanges 322 and 324, through upper pivot aperture 326 and aperture 290 and upper pivot aperture 330 and aperture 294, respectively. A lower guide member 250 is pivotally coupled on the inside face 340 of each lateral flange 322, 324, at pivots 342, which extend inward from the outer surface of lateral flanges 322 and 324, through lower pivot apertures 328 and into aperture 308. The positioning notch 316 of each lower guide member 250 is engaged with one of positioning tabs 300, 302, of upper guide member 248 as before so that as upper guide member 248 pivots, lower guide members 250 pivot in unison a corresponding distance in the opposite pivotal direction.

Follower pins 344, 346, are received through apertures 266, 270, and 268, 272, of inner carrier 246, respectively. Inner carrier 246 is received between lateral flanges 282, 284 of upper guide member 248 and between lower guide members 250. Follower pin 344 presents opposing ends 348, 350, which are slidably or rollably engaged in guide structures 296, 298, of upper guide member 248 respectively. Follower pin 346 presents opposing ends 352, 354, which are slidably or rollably engaged in guide structures 310 of the separate lower guide members 250.

Adjustment assembly 254 generally includes carrier 356, adjustment screw 358, and pivot block 360. Carrier 356 generally includes an L-shaped body portion 362 with a pair of opposing lateral ears 364. Body portion 362 is pivotally coupled between lateral flanges 322, 324, of outer carrier 252 with pivots 366 extending through apertures 337 into ears 364. Adjustment screw 358 has threaded shaft portion 367 extending through front wall 368 of body portion 362. Retainer 369 and knob 370 on either side of front wall 368 retain and prevent translation of adjustment screw 358 relative to body portion 362. Pivot block 360 is pivotally coupled between lateral flanges 282, 284, of upper guide member 248 with pivots 372 extending through apertures 288 and 292 and into pivot block 360. Pivot block 360 further defines transverse threaded aperture 374 which receives threaded shaft portion 367 of adjustment screw 358.

Figure 27:
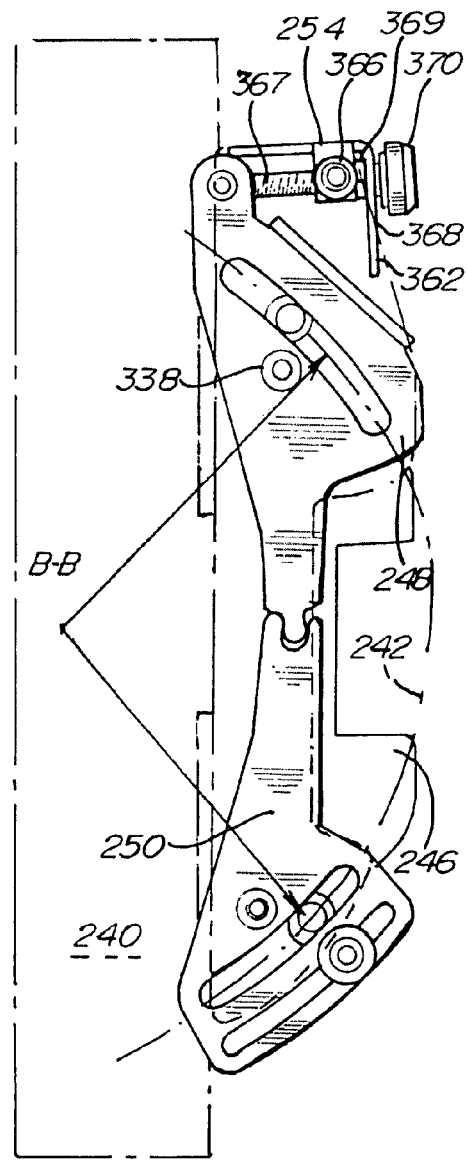
FIG. 27 is a fragmentary side elevation view of the mount and display of FIG. 20 with the outer carrier, interface plate and display depicted in phantom and with the tilt axis positioned in a first location at a first distance from the interface plate.
Figure 28:
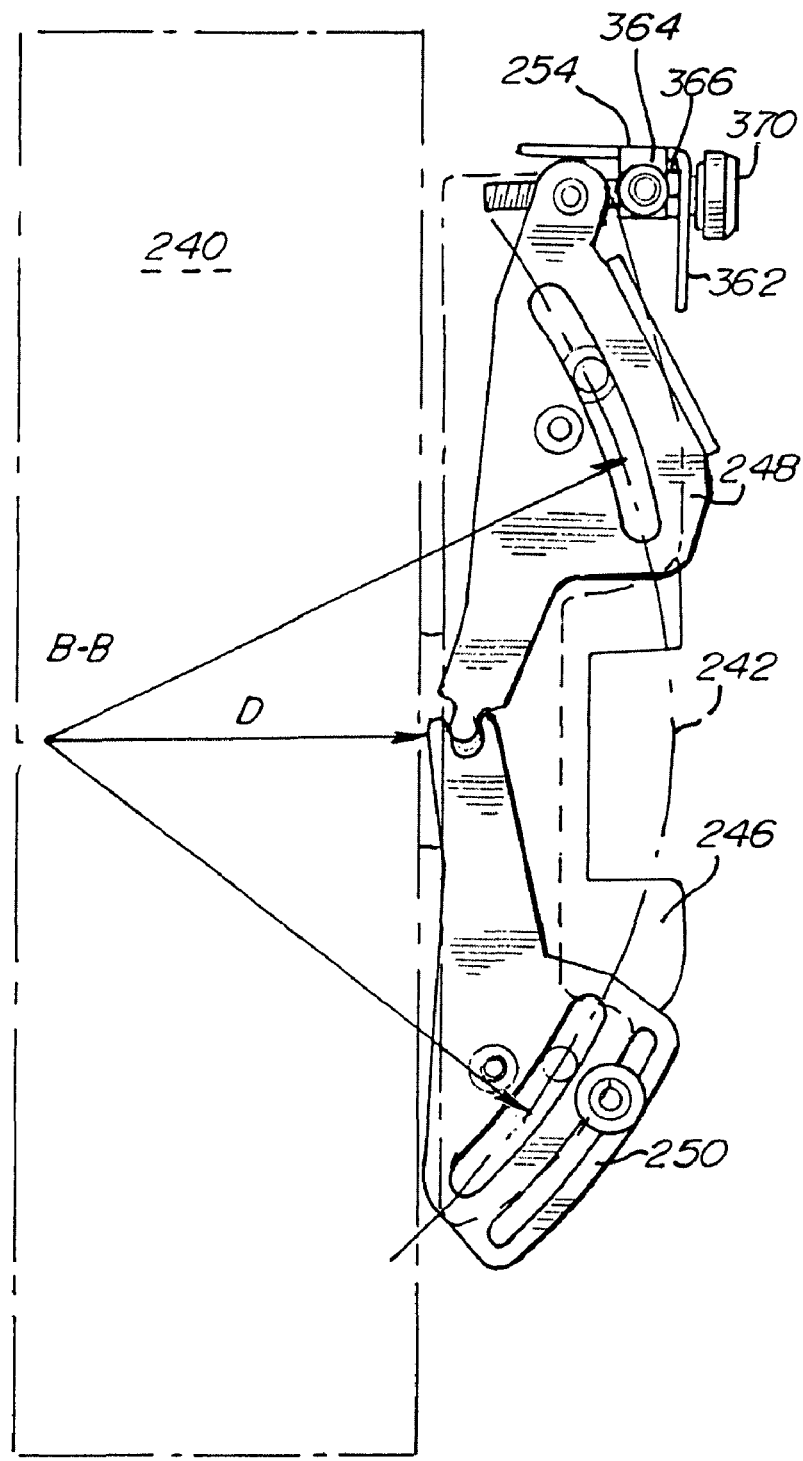
FIG. 28 is a fragmentary side elevation view of the mount and display of FIG. 20 with the outer carrier, interface plate and display depicted in phantom and with the tilt axis positioned in a second location at a second distance from the interface plate.

In use, as adjustment screw 358 is tightened, pivot block 360 is drawn toward front wall 368, causing upper guide member 248 to pivot about pivots 338 in a clockwise direction when viewed from the vantage point of FIGS. 27 and 28. Due to the engagement of positioning tabs 300, 302, in positioning notches 312, lower guide members 250 are simultaneously pivoted counterclockwise about pivots 342 when viewed from the vantage point of FIGS. 27 and 28. As a result of the pivoting motion of upper guide member 248 and lower guide members 250, the orientation of slots 296, 298, and 310 is altered so as to define new arcs 242 having a relatively larger radius R. Tilt Axis B-B is moved away from interface plate 78, so that distance D is relatively larger.

Correspondingly, as adjustment screw 358 is loosened, pivot block 360 is urged away from front wall 368, causing upper guide member 248 to pivot about pivots 338 in a counterclockwise direction when viewed from the vantage point of FIGS. 27 and 28. Due to the engagement of positioning tabs 300, 302, in positioning notches 312, lower guide members 250 are simultaneously pivoted clockwise about pivots 342 when viewed from the vantage point of FIGS. 27 and 28. As a result of the pivoting motion of upper guide member 248 and lower guide members 250, the orientation of slots 296, 298, and 310 is altered so as to define new arcs 242 having a relatively smaller radius R. Tilt Axis B-B is toward from interface plate 78, so that distance D is relatively smaller.

A display 240 or other device coupled to interface plate 78 may be tilted about tilt axis B-B, for example by pushing or pulling the top or bottom edge of the display 240. Follower pins 344, 346, will slide or roll in slots 296, 298 and 310, and outer carrier 252, upper guide member 248, lower guide members 250, interface plate 78 and the attached electronic display 240 will rotate about tilt axis B-B.

Although the present invention has been described with respect to the various embodiments, it will be understood that numerous insubstantial changes in configuration, arrangement or appearance of the elements of the present invention can be made without departing from the intended scope of the present invention. Accordingly, it is intended that the scope of the present invention be determined by the claims as set forth below.

What is claimed is:

1. A mounting system for an electronic display device presenting a back surface, the system comprising:
  a support structure adapted to attach to a fixed structure; and
  a display interface assembly operably coupled with the support structure, the display interface assembly comprising:
    an interface member presenting a display mounting surface for receiving the electronic display thereon; and
    a tilt head assembly defining a substantially horizontal tilt axis oriented substantially parallel with the display mounting surface of the interface member and spaced apart from the display mounting surface of the interface member such that when the electronic display device is received on the display mounting surface of the interface member with the back surface of the electronic display device abutting the display mounting surface of the interface member, the tilt axis extends through the electronic display device, the tilt head assembly including a control mechanism for selectively shifting the tilt axis relative to the display mounting surface of the interface member between a first location spaced apart a first distance from the display mounting surface of the interface member and a second location spaced apart a second distance from the display mounting surface of the interface member, wherein the second distance is greater than the first distance.

2. The system of claim 1, wherein the tilt head assembly comprises:
a first carrier having at least one follower; and
a first guide member defining a first guide structure positioned along an arc centered on the tilt axis, wherein the at least one follower and the first guide structure are engaged and together define a range of tilt motion about the tilt axis, and wherein the control mechanism is operably coupled with the first guide member to selectively shift an orientation of the first guide structure to thereby effect selective shifting of the tilt axis between the first and second locations.

3. The system of claim 2, wherein the first guide structure is curved.

4. The system of claim 2, wherein the first guide structure is substantially straight.

5. The system of claim 2, wherein the first guide structure is angular.

6. The system of claim 2, wherein the first guide structure is a slot.

7. The system of claim 2, further comprising a second guide member defining a second guide structure positioned along the arc centered on the tilt axis, wherein the first carrier includes at least a pair of followers, and wherein one of the pair of followers is engaged with the first guide structure and the other of the pair of followers is engaged with the second guide structure.

8. The system of claim 7, wherein the first and second guide members are operably coupled such that when the orientation of first guide structure is shifted with the control mechanism, an orientation of the second guide member is also shifted.

9. A mounting system for an electronic display device presenting a back surface, the system comprising:
a support structure adapted to attach to a fixed structure; and
a display interface assembly operably coupled with the support structure, the display interface assembly comprising:
an interface member presenting a display mounting surface for receiving the electronic display thereon; and
a tilt head assembly defining a substantially horizontal tilt axis oriented substantially parallel with the display mounting surface of the interface member and spaced apart forward of forwardly from the display mounting surface of the interface member such that when the electronic display device is received on the display mounting surface of the interface member with the back surface of the electronic display device abutting the display mounting surface of the interface member, the tilt axis extends through the electronic display device, the tilt head assembly including means for selectively shifting the tilt axis relative to the display mounting surface of the interface member between a first location spaced apart a first distance from the display mounting surface of the interface member and a second location spaced apart a second distance from the display mounting surface of the interface member, wherein the second distance is greater than the first distance.

10. The system of claim 9, wherein the tilt head assembly comprises:
a first carrier having at least one follower; and
a first guide member defining a first guide structure positioned along an arc centered on the tilt axis, wherein the at least one follower and the first guide structure are engaged and together define a range of tilt motion about the tilt axis.

11. The system of claim 10, wherein the first guide structure is curved.

12. The system of claim 10, wherein the first guide structure is substantially straight.

13. The system of claim 10, wherein the first guide structure is angular.

14. The system of claim 10, wherein the first guide structure is a slot.

15. The system of claim 10, wherein the means for selectively shifting the tilt axis includes an adjustment screw operably coupled with the first guide member such that selective rotation of the adjustment screw shifts an orientation of the first guide structure to thereby effect selective shifting of the tilt axis between the first and second locations.

16. The system of claim 15, further comprising a second guide member defining a second guide structure positioned along the arc centered on the tilt axis, wherein the first carrier includes at least a pair of followers, and wherein one of the pair of followers is engaged with the first guide structure and the other of the pair of followers is engaged with the second guide structure.

17. The system of claim 16, wherein the first and second guide members are operably coupled such that when the orientation of first guide structure is shifted with the adjustment screw, an orientation of the second guide member is also shifted.

18. An electronic display system comprising:
an electronic display device with a front side presenting a display screen and an opposing rear side; and
a mount for attaching the electronic display device to a fixed structure; the mount including:
a support structure adapted to attach to a fixed structure; and
a display interface assembly operably coupled with the support structure, the display interface assembly including:
an interface member presenting a display mounting surface, confronting the display mounting surface of the interface member abutting the rear side of the electronic display device; and a tilt head assembly defining a substantially horizontal tilt axis oriented substantially parallel with the display mounting surface of the interface member and spaced apart from the display mounting surface of the interface member such that the tilt axis extends through the electronic display device, the tilt head assembly including a control mechanism for selectively shifting the tilt axis relative to the display mounting surface of the interface member between a first location spaced apart a first distance from the display mounting surface of the interface member and a second location spaced apart a second distance from the display mounting surface of the interface member, wherein the second distance is greater than the first distance.

19. The system of claim 18, wherein the tilt head assembly comprises:
a first carrier having at least one follower; and
a first guide member defining a first guide structure positioned along an arc centered on the tilt axis, wherein the at least one follower and the first guide structure are engaged and together define a range of tilt motion about the tilt axis, and wherein the control mechanism is operably coupled with the first guide member to selectively shift an orientation of the first guide structure to thereby effect selective shifting of the tilt axis between the first and second locations.

20. The system of claim 19, further comprising a second guide member defining a second guide structure positioned along the arc centered on the tilt axis, wherein the first carrier includes at least a pair of followers, and wherein one of the pair of followers is engaged with the first guide structure and the other of the pair of followers is engaged with the second guide structure.

21. The system of claim 20, wherein the first and second guide members are operably coupled such that when the orientation of first guide structure is shifted with the control mechanism, an orientation of the second guide member is also shifted.

* * * * *